(12) United States Patent
Sasaki et al.

(10) Patent No.: US 6,415,105 B1
(45) Date of Patent: Jul. 2, 2002

(54) IMAGE STABILIZER

(75) Inventors: Takamitsu Sasaki; Yukio Uenaka, both of Saitama (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/573,358

(22) Filed: May 18, 2000

(30) Foreign Application Priority Data

May 21, 1999 (JP) .......................................... 11-141200

(51) Int. Cl.[7] ................................................. G03B 5/00
(52) U.S. Cl. ...................................................... 396/55
(58) Field of Search ........................................... 396/55

(56) References Cited

U.S. PATENT DOCUMENTS

| 4,996,545 A | | 2/1991 | Enomoto et al. | ............. 396/53 |
| 5,602,675 A | | 2/1997 | Okada | ......................... 359/554 |
| 5,721,969 A | | 2/1998 | Arai | .............................. 396/55 |
| 5,771,069 A | * | 6/1998 | Kobayashi | ................ 396/55 X |
| 6,157,779 A | * | 12/2000 | Kosaka et al. | ................ 396/55 |

FOREIGN PATENT DOCUMENTS

JP          6-289465        10/1994

* cited by examiner

*Primary Examiner*—W. B. Perkey
(74) *Attorney, Agent, or Firm*—Greenblum & Bernstein, P.L.C.

(57) ABSTRACT

An image stabilizer includes a movable member which supports an image-stabilizing optical system; a base which supports the movable member to be movable in a plane perpendicular to an optical axis of the image-stabilizing optical system; and at least three tilt prevention mechanisms, arranged on a circle centered on the optical axis, for preventing the image-stabilizing optical system from tilting when the image stabilizing optical system reaches a movable limit. Each tilt prevention mechanism includes a conically-tapered annular convex surface and a conically-tapered annular concave surface, the conically-tapered annular convex surface and the conically-tapered annular concave surface being correspondingly formed on one and the other of the movable member and the base, respectively, so that the conically-tapered annular convex surface contacts the conically-tapered annular concave surface when the movable member reaches the movable limit.

20 Claims, 21 Drawing Sheets

⊙ ... Current flowing out from the page

⊗ ... Current flowing into the page

IMAGE STABILIZER

BACKGROUND OF THE INVENTION

1. Field of the Invention

The present invention relates to an image stabilizer provided in an optical instrument such as a camera, a pair of binoculars or the like, wherein the image stabilizer is provided with an image-stabilizing optical system which is driven to prevent the object image in the optical instrument from shaking due to hand movement.

2. Description of the Related Art

Optical instruments such as cameras, binoculars or the like which are provided with an image stabilizer having a vibration compensation function are well known. The image stabilizer is provided with an image-stabilizing optical system and operates to compensate the shaking of the object image (hereinafter referred to as "image shake") in the optical instrument by driving the image-stabilizing optical system in a plane perpendicular to the optical axis thereof.

The image-stabilizing optical system should be driven in a two-dimensional plane perpendicular to the optical axis. Therefore, if the image-stabilizing optical system slightly tilts with respect to the optical axis due to play, the focal point may deviate from the original position thereof. In practice, the clearance between the image-stabilizing optical system and the member or members which support and guide the image-stabilizing optical system cannot be made small enough to eliminate such play. Due to this reason, the image-stabilizing optical system is usually biased forwardly or rearwardly along the optical axis by a spring or springs to offset such play.

The image stabilizer can stabilize the object image only within a predetermined operable range of the image-stabilizing optical system, so that a movable limit position thereof in a direction perpendicular to the optical axis corresponds to the compensation limit position in the one direction. Generally, at the time the image-stabilizing optical system reaches a movable limit position thereof, the image-stabilizing optical system is controlled to stop electrically or stopped mechanically by a mechanical limit stop. However, due to a moment of inertia and the like, it is often the case that some drive force is still given to the image-stabilizing optical system even after it reaches to a compensation limit position. At this moment, the image-stabilizing optical system, which does not have any escape zone, undesirably tilts against the spring force of the aforementioned spring or springs.

Once such tilt occurs, several problems arise. Namely, the image-forming performance deteriorates, so that, e.g., the focal point deviates from the original position thereof. Moreover, the precision in detection of the position of the image-stabilizing optical system may deteriorate. In the case where the image stabilizer uses coils and permanent magnets to drive the image-stabilizing optical system, the electromagnetic force which is generated when current is supplied to one or more turns of wire positioned in magnetic field (i.e., the force represented by left-hand rule or Fleming's rule) is utilized to drive the image-stabilizing optical system. However, since each coil itself generates magnetic field, magnetic attraction somewhat acts on the movement of the image-stabilizing optical system because of the positional relation between the coils and the permanent magnets, which also causes the image-stabilizing optical system to tilt.

SUMMARY OF THE INVENTION

The primary object of the present invention is to provide an image stabilizer which prevents the tilt of the image-stabilizing optical system, upon an image-stabilizing operation.

To achieve the object mentioned above, according to an aspect of the present invention, an image stabilizer is provided, including a movable member which supports an image-stabilizing optical system, a base which supports the movable member to be movable in a plane perpendicular to an optical axis of the image-stabilizing optical system, and at least three tilt prevention mechanisms, arranged on a circle centered on the optical axis, for preventing the image-stabilizing optical system from tilting at the time the image-stabilizing optical system reaches a movable limit position thereof in the plane perpendicular to the optical axis. Each of the at least three tilt prevention mechanisms includes a conically-tapered annular convex surface and a conically-tapered annular concave surface having an axis extending parallel to the optical axis, the conically-tapered annular convex surface and the conically-tapered annular concave surface being correspondingly formed on one and the other of the movable member and the base, respectively, so that the conically-tapered annular convex surface contacts the conically-tapered annular concave surface when the movable member reaches the movable limit position.

Preferably, each of the at least three tilt prevention mechanisms is arranged at an equi-angular distance therebetween about the optical axis.

Preferably, an outer diameter of the conically-tapered annular convex surface is smaller than an inner diameter of the conically-tapered annular concave surface.

In an embodiment, the movable member includes at least three projecting portions, arranged on a circle centered on the optical axis, each of the at least three projecting portions contacting with the base in a direction of the optical axis. The conically-tapered annular convex surface is provided on each of the at least three projecting portions.

In this embodiment, preferably, the base includes at least three plane circular surfaces with which the at least three projecting portions come into contact, respectively; and at least three ring-shaped protuberances which protrude towards the movable member from circumferences of the at least three plane circular surfaces, respectively. The conically-tapered annular concave surface is formed on an end surface of each of the at least three ring-shaped protuberances.

Each of the at least three projecting portions formed on the movable member can include a slidable member which is supported so as to be slidable in a direction parallel to the optical axis with respect to the movable member, and is continuously biased towards the base so as to contact the base. In this arrangement, the conically-tapered annular convex surface of the projecting portion is formed around the slidable member. In order to support the slidable member, for example, each of the at least three projecting portions includes a guide hole which extends in the direction of the optical axis, the slidable member being slidably fitted in the guide hole. A compression spring is provided in the guide hole, for biasing the slidable member towards the base.

In an embodiment, a support plate is further provided fixed to the base, and the movable member on which the at least three projecting portions are formed is positioned between the support plate and the base.

Each of the at least three projecting portions formed on the movable member can include a slidable member which is supported so as to be slidable in a direction parallel to the optical axis with respect to the movable member, and is continuously biased towards the support plate so as to contact the support plate. In this arrangement, the conically-tapered annular convex surface of the projecting portion is formed around the slidable member.

In an embodiment, the base includes at least three projecting portions, arranged on a circle centered on the optical axis, each of the at least three projecting portions contacting with the movable member in a direction of the optical axis, wherein the conically-tapered annular convex surface is provided on each of the at least three projecting portions.

In this embodiment, preferably, the movable member includes at least three plane circular surfaces with which the at least three projecting portions come into contact, respectively; and at least three ring-shaped protuberances which protrude towards the base from circumferences of the at least three plane circular surfaces, respectively. The conically-tapered annular concave surface is formed on an end surface of each of the at least three ring-shaped protuberances.

Each of the at least three projecting portions formed on the base can include a slidable member which is supported so as to be slidable in a direction parallel to the optical axis, and is continuously biased towards the movable member so as to contact the movable member. In this arrangement, the conically-tapered annular convex surface of the projecting portion is formed around the slidable member.

Further, the image stabilizer of the present invention can include a first drive device which drives the movable member in a first direction perpendicular to the optical axis; and a second drive device which drives the movable member in a second direction perpendicular to the optical axis, the first direction and second direction being orthogonal to each other.

The first drive device can include, for example, a first magnet fixed to one of the base and the movable member, and a first coil fixed to the other of the base and the movable member to face the first magnet, and the second drive device can include a second magnet fixed to the one of the base and the movable member, and a second coil fixed to the other of the base and the movable member to face the second magnet.

In an embodiment, the image stabilizer further includes first and second gyro sensors for sensing vibration in the first direction and the second direction, respectively; and a controller which supplies drive current to each of the first coil and the second coil, wherein the strength of the drive current is determined in accordance with output of each of the first and second gyro sensors.

The image stabilizer can be incorporated in a camera. Furthermore, the image stabilizer can be formed as a unit.

According to another aspect of the present invention, an image stabilizer is provided, including a movable member which supports an image-stabilizing optical system, a base which supports the movable member to be movable in a plane perpendicular to an optical axis of the image-stabilizing optical system, and a tilt prevention device for preventing the image-stabilizing optical system from tilting at the time the image-stabilizing optical system reaches a movable limit position thereof in the plane perpendicular to the optical axis. The tilt prevention device includes at least three tilt prevention mechanisms arranged on a circle centered on the optical axis at an equi-angular distance therebetween about the optical axis.

Preferably, each of the at least three tilt prevention mechanisms is arranged at an equi-angular distance therebetween about the optical axis.

Each of the three tilt prevention mechanisms can include, for example, a conically-tapered annular convex surface and a conically-tapered annular concave surface formed on one and the other of the movable member and the base, respectively, each of the conically-tapered annular convex surface and the corresponding conically-tapered annular concave surface having an axis extending parallel to the optical axis. When the image-stabilizing optical system reaches the movable limit position thereof in the plane perpendicular to the optical axis, the conically-tapered annular convex surface and the conically-tapered annular concave surface, of each of the tilt prevention mechanism, contact each other so that tilting of the movable member with respect to the base is prevented.

The present disclosure relates to subject matter contained in Japanese Patent Application No.11-141200 (filed on May 21, 1999) which is expressly incorporated herein by reference in its entirety.

BRIEF DESCRIPTION OF THE DRAWINGS

The present invention will be described below in detail with reference to the accompanying drawings in which.

DESCRIPTION OF THE PREFERRED EMBODIMENT

Figure 15:
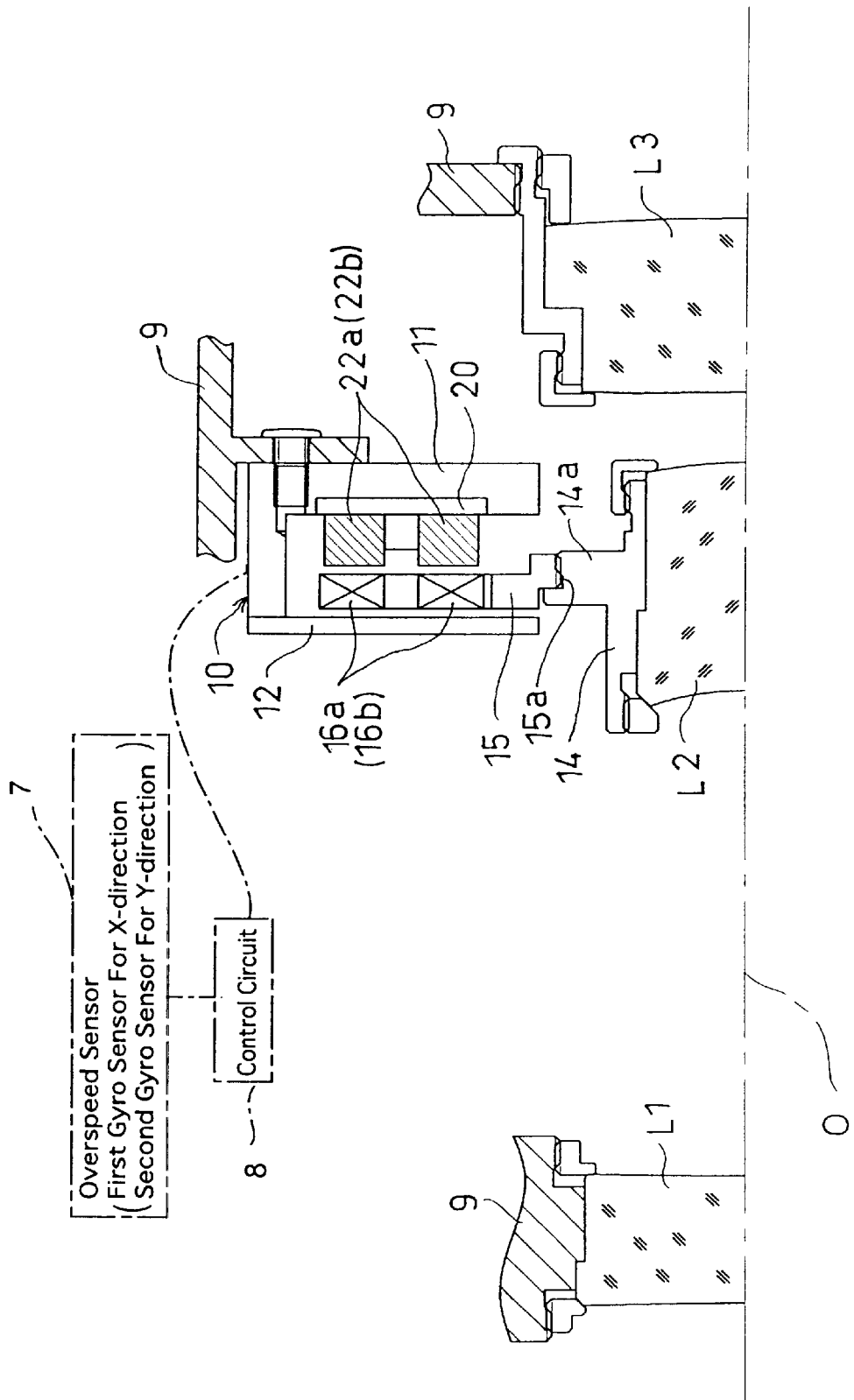
FIG. 15 is a schematic cross sectional view of a photographic optical system and the image stabilizer unit, showing an upper half thereof from the optical axis.

FIG. 15 shows an arrangement of a photographic optical system and an image stabilizer to which the present invention is applied. The photographic optical system and the image stabilizer are positioned within a camera body (not shown), e.g., a camera body of a lens-shutter type of camera. The photographic optical system includes a first lens group L1, a second lens group (image-stabilizing optical system) L2 and a third lens group L3. The image stabilizer to which the present invention is applied operates to compensate the shaking of the object image (hereinafter referred to as "image shake"), focused on a film plane (not shown) through the photographic optical system, by driving the second lens group L2 in a plane perpendicular to the optical axis O of the photographic optical system. The second lens group L2 is driven in a plane perpendicular to the optical axis O by an image stabilizer unit 10, whose outward appearance is shown in FIG. 2.

In the image stabilizer unit 10, the term 'forward' expresses a direction toward object (i.e., left in FIG. 15) and the term 'rearward' expresses a direction toward an image plane of the photographic optical system (i.e., right in FIG. 15).

The camera is provided therein with an overspeed sensor 7 (see FIG. 15) which includes a first gyro sensor (vibration sensor) for exclusively sensing vibration or shake in the X-direction (horizontal direction) and a second gyro sensor (vibration sensor) for exclusively sensing vibration or shake in the Y-direction (vertical direction) perpendicular to the X-direction. The first and second gyro sensors together sense vibration or shake of the camera body caused by the hand movement of the user. The camera is further provided therein with a control circuit 8 which supplies drive current whose strength is determined in accordance with the output of the overspeed sensor 7 to coils (first and second coils 16a and 16b) positioned in the image stabilizer unit 10. The control circuit 8 calculates an amount of movement of the second lens group L2 that is necessary for compensating the image shake in accordance with the output of the overspeed sensor 7, and performs a feedback control to calculate the same in accordance with the output of the overspeed sensor 7. The image stabilizer unit 10, the first lens group L1 and the third lens group L3 are fixed to a stationary member 9 of a lens barrel of the camera.

Figure 1:
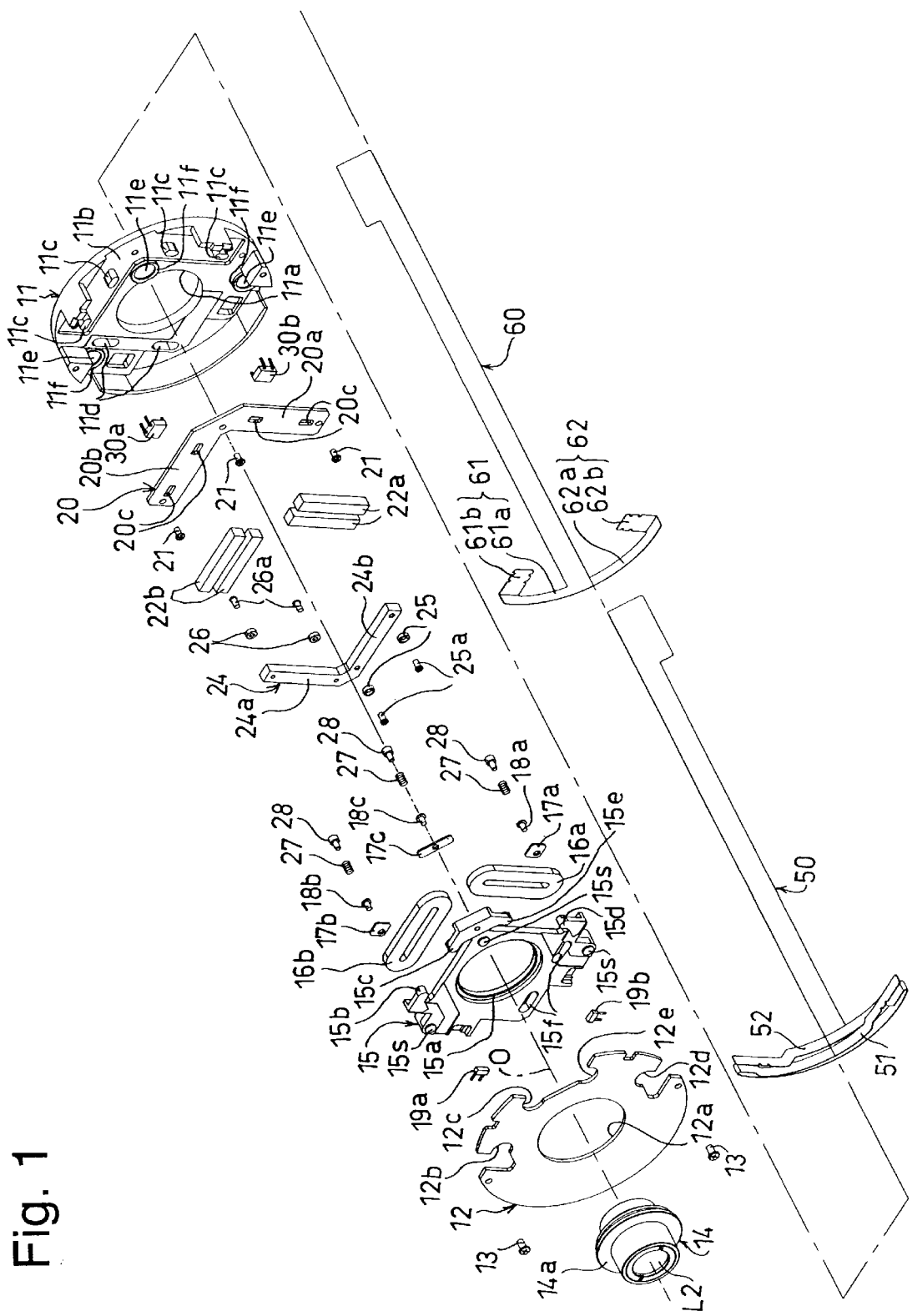
FIG. 1 is an exploded perspective view of an embodiment of an image stabilizer unit to which the present invention is applied.
Figure 2:
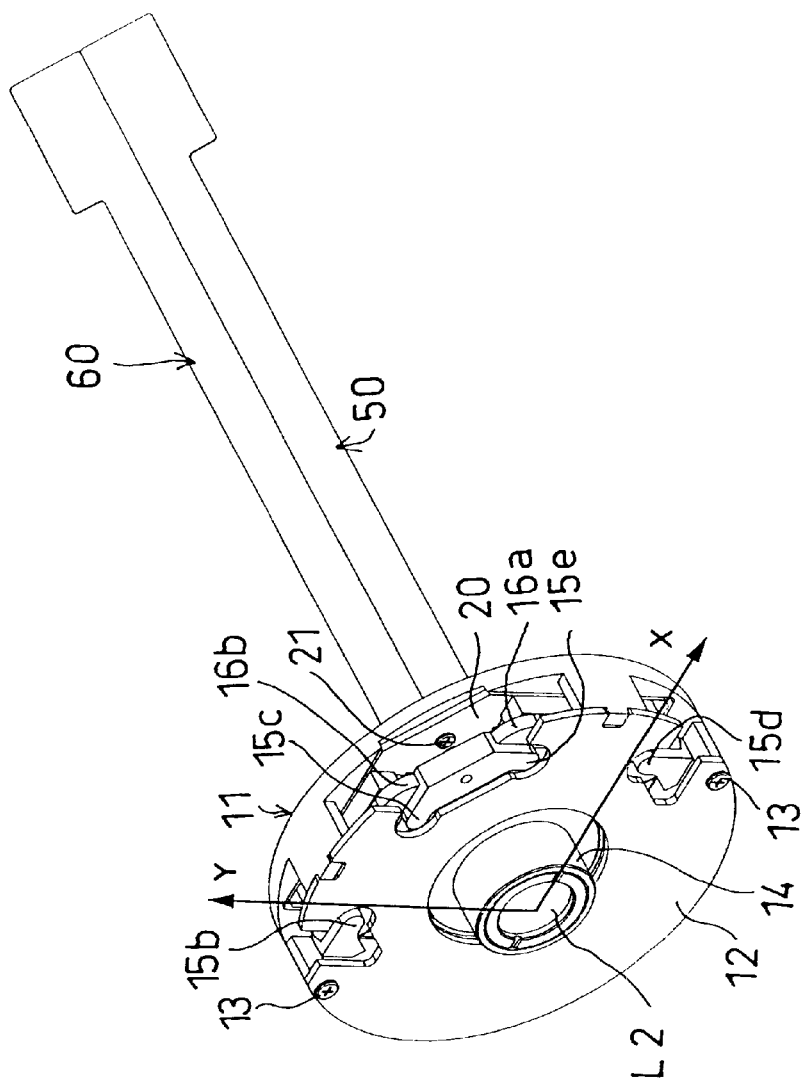
FIG. 2 is a perspective view of the image stabilizer unit shown in FIG. 1.
Figure 3:
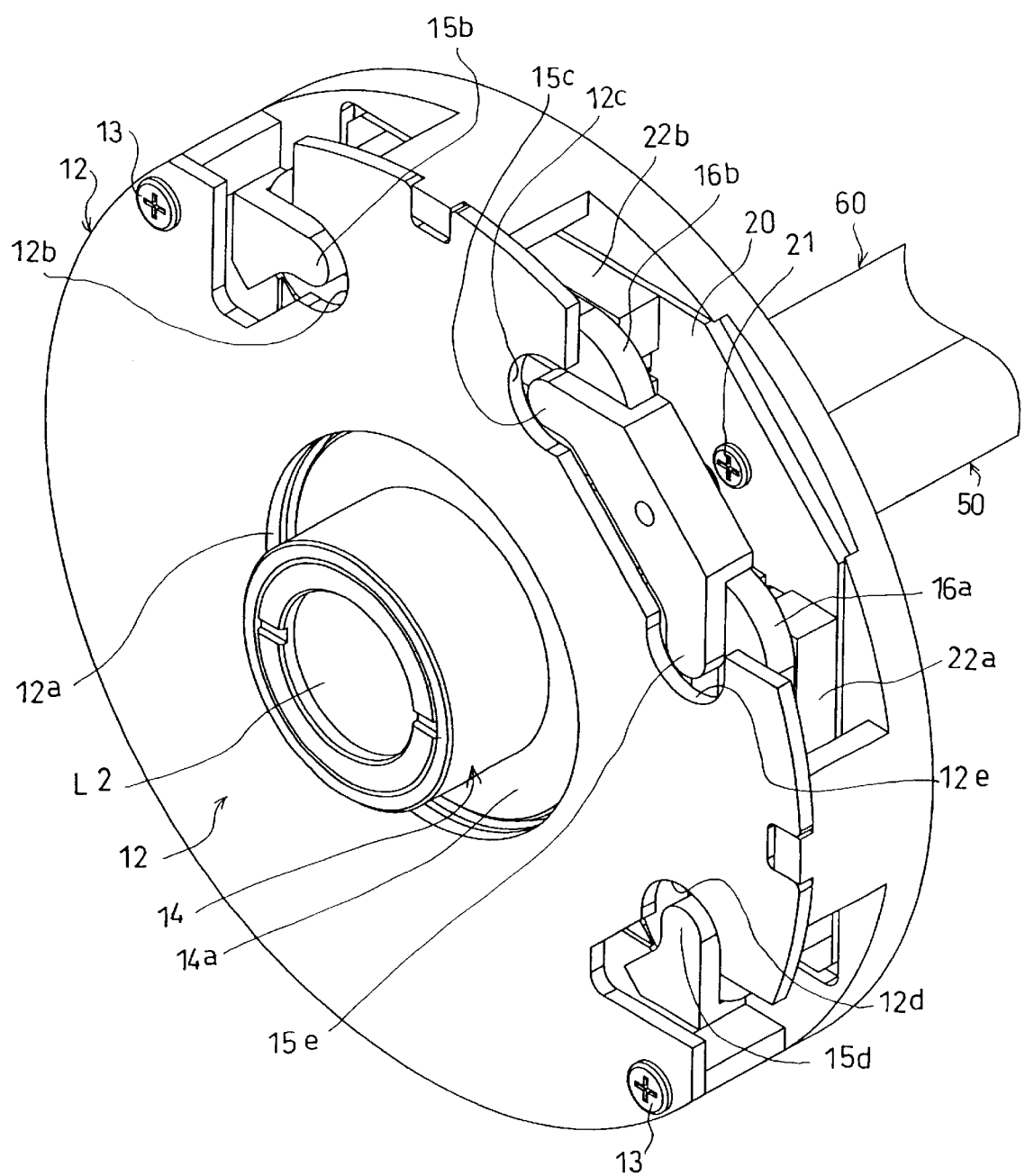
FIG. 3 is an enlarged perspective view of the image stabilizer unit shown in FIG. 2.
Figure 4:
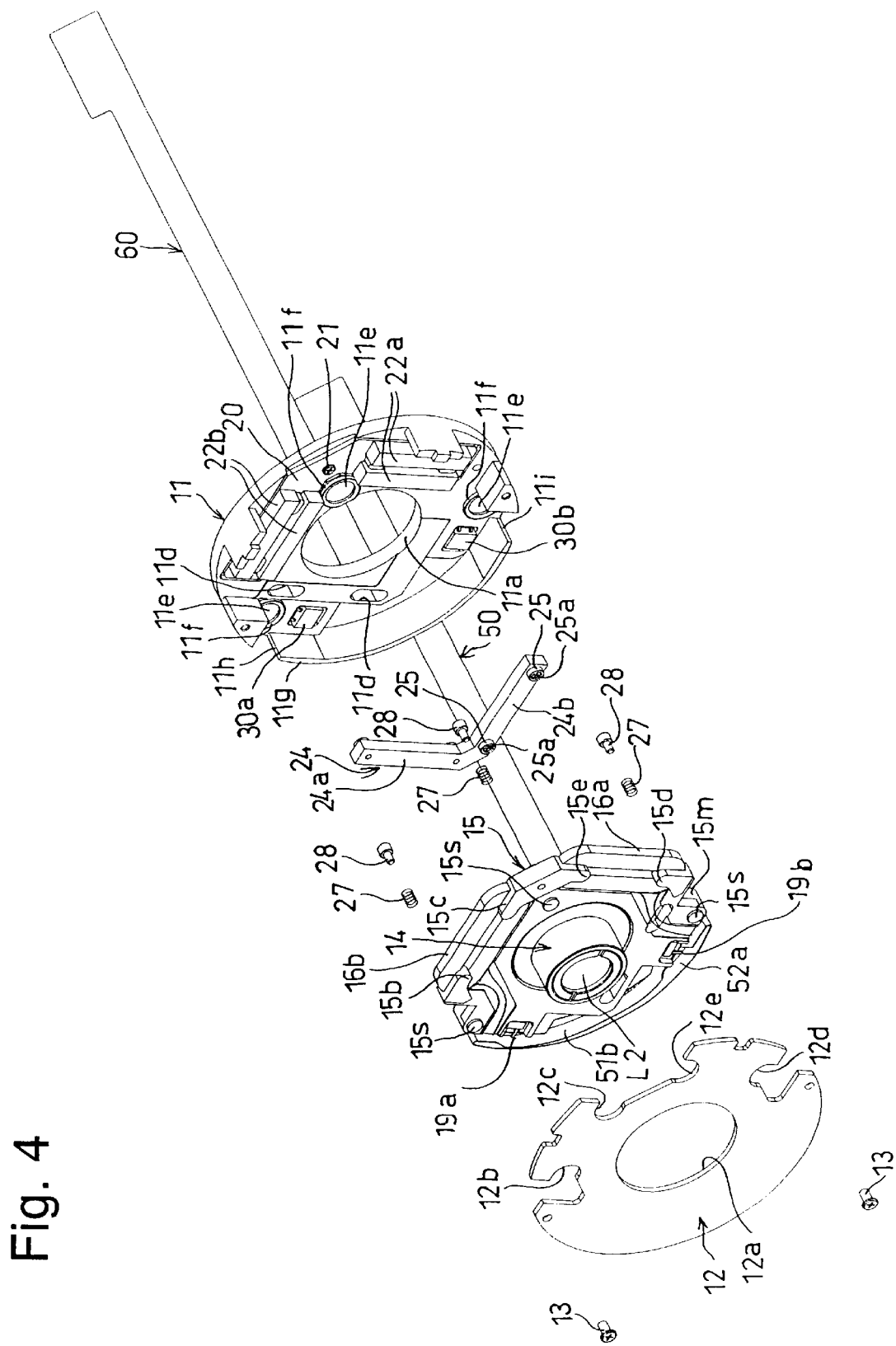
FIG. 4 is a partly exploded perspective view of the image stabilizer unit shown in FIG. 2.

FIG. 1 shows an exploded perspective view of an embodiment of the image stabilizer unit 10, while FIGS. 2 and 3 each show a perspective view of the image stabilizer unit 10. The image stabilizer unit 10 is provided at the center thereof with the second lens group L2 and is formed as a unit in a substantially cylindrical shape with the axis of the image stabilizer unit 10 being coincident with the optical axis O of the photographic optical system. Two flexible printed wiring boards, i.e., a first flexible printed wiring board 50 and a second flexible printed wiring board 60 are connected to the image stabilizer unit 10 to extend rearwardly along the direction of the optical axis O. In this specification a flexible printed wiring board is hereinafter referred to as a flexible PWB.

The image stabilizer unit 10 is provided with a base 11. The base 11 is provided at the center thereof with a circular opening 11a (see FIG. 1) whose center coincides with the optical axis O. The image stabilizer unit 10 is provided with a yoke plate (support plate) 12 which is secured to the front of the base 11 by a plurality of set screws 13. The image stabilizer unit 10 contains a drive mechanism for driving the second lens group L2 in a space between the base 11 and the yoke plate 12. A movable frame (a movable member) 15 which is driven by this drive mechanism is held between the base 11 and the yoke plate 12.

The second lens group L2 is supported by a lens frame 14. This lens frame 14 is secured to the movable frame 15 which is guided to be movable in a plane perpendicular to the optical axis O in the image stabilizer unit 10. The lens frame 14 is provided on an outer peripheral surface with a flange 14a (see FIG. 1) having a male thread around an outer peripheral surface thereof. This male thread is screw-engaged with a female thread formed on an inner peripheral surface of the circular central opening 15a of the movable frame 15 to secure the lens frame 14 to the movable frame 15.

A pair of coils, i.e., a first coil 16a and a second coil 16b are fixedly mounted on the movable frame 15. The first coil 16a is provided for exclusively driving the movable frame 15 in a horizontal direction (i.e., the X-direction shown in FIG. 2, perpendicular to the optical axis O) of the camera body. The first coil 16a is fixed to the movable frame 15 so that the longitudinal direction of the first coil 16a coincides with a vertical direction (i.e., the Y-direction perpendicular shown in FIG. 2, perpendicular to the X-direction) of the camera body. On the other hand, the second coil 16b is provided for exclusively driving the movable frame 15 in the vertical direction (i.e., the Y-direction) of the camera body. The second coil 16b is fixed to the movable frame 15 so that the longitudinal direction of the second coil 16b coincides with the horizontal direction (i.e., the X-direction) of the camera body.

One end (the lower end as viewed in FIG. 1) of the first coil 16a is held between the movable frame 15 and a first coil holding plate 17a secured to the movable frame 15 by a set screw 18a. Likewise, one end (the left end as viewed in FIG. 1) of the second coil 16b is held between the movable frame 1.5 and a second coil holding plate 17b secured to the movable frame 15 by a set screw 18b. The other ends of the first and second coils 16a and 16b which are positioned adjacent to each other are held by a common plate, i.e., a third coil holding plate 17c which is secured to the movable frame 15 by a set screw 18c.

The movable frame 15 is provided, at an end thereof on the opposite side of the central opening 15a from the first coil 16a, with a first LED 19a which emits infrared rays used to detect the position of the movable frame 15 in the X-direction. The movable frame 15 is provided, at an end thereof on the opposite side of the central opening 15a from the second coil 16b, with a second LED 19b which emits infrared rays used to detect the position of the movable frame 15 in the Y-direction. The first and second LEDs 19a and 19b are secured to the movable frame 15.

The movable frame 15 is formed integral with a pair of projections 15b and 15c positioned adjacent to the opposite ends of the second coil 16b in the longitudinal direction thereof, respectively. Each of the projections 15b and 15c extends forwardly in the direction of the optical axis by a predetermined length. Likewise, the movable frame 15 is formed integral with another pair of projections 15d and 15e positioned adjacent to the opposite ends of the first coil 16a in the longitudinal direction thereof, respectively. Each of the projections 15d and 15e extends forwardly in the direction of the optical axis by a predetermined length.

The movable frame 15 is provided with a pair of guide slots 15f which are positioned on the opposite side of the central opening 15a from the second coil 16b to be aligned in the X-direction. The image stabilizer unit 10 is provided therein with an L-shaped guide bar 24 positioned behind the movable frame 15. This L-shaped guide bar 24 is provided thereon with a first pair of guide rings 25 which are slidably fitted in the pair of guide slots 15f, respectively.

Figure 5:
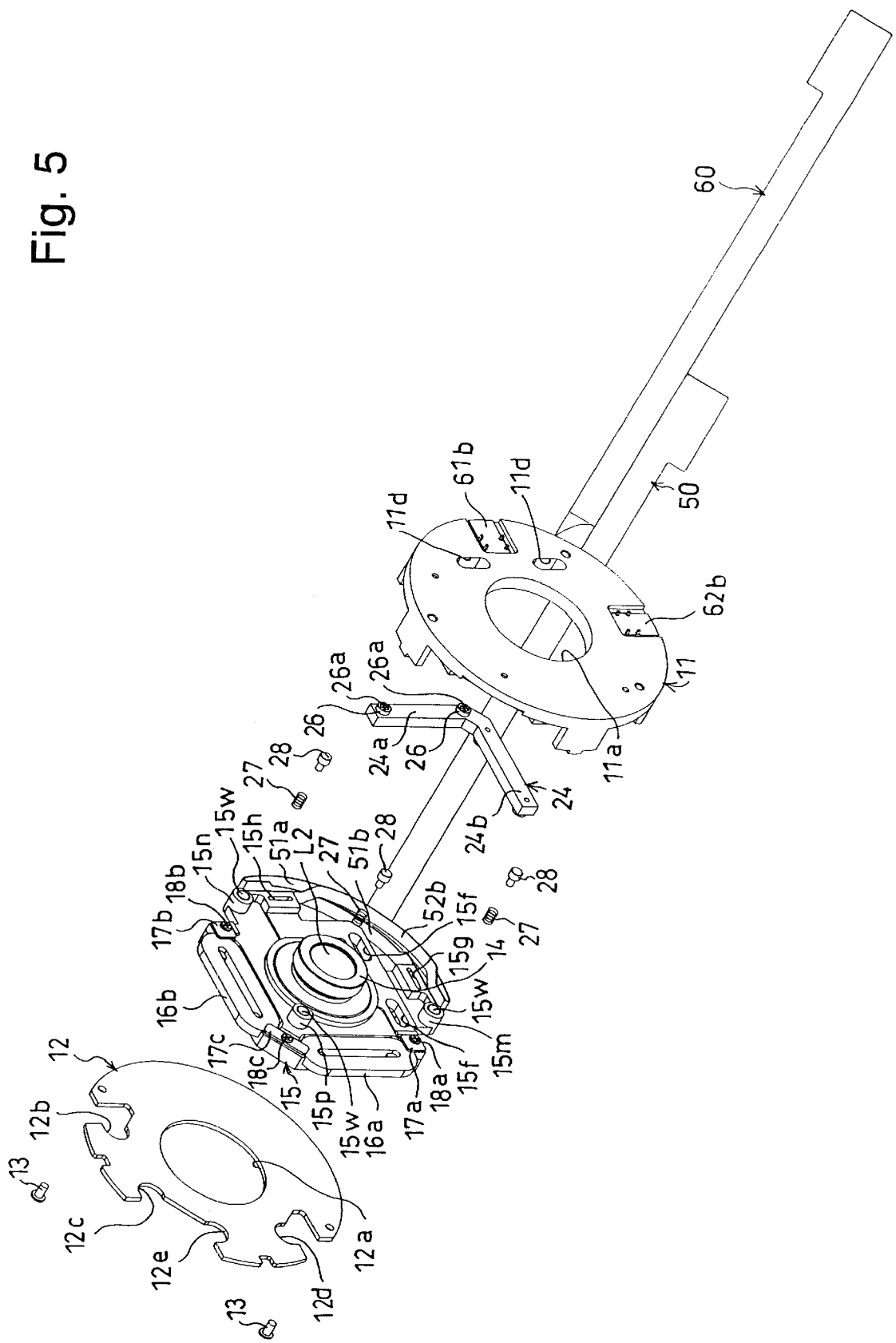
FIG. 5 is a partly exploded perspective view of the image stabilizer unit shown in FIG. 2, seen from a different angle.

The movable frame 15 is provided in the vicinity of the first, second and third coil holding plates 17a, 17b and 17c with hollow cylindrical portions 15m, 15n and 15p, respectively, each of which extends rearwardly in the direction of the optical axis O (see FIG. 5). The three cylindrical portions 15m, 15n and 15p, are arranged on a circle centered on the optical axis O, and each of the three cylindrical portions 15m, 15n and 15p is arranged at an equi-angular distance therebetween about the optical axis O. Further, each of the three cylindrical portions 15m, 15n and 15p, which are positioned around the optical axis O, is closed at the bottom thereof (i.e., the front end thereof) but is open at the rear end thereof (i.e., the end thereof which faces the base 11) to form a guide hole 15w. In the guide hole 15w of each cylindrical portions 15m, 15n and 15p, a compression spring (coil spring) 27 and a slidable pin (slidable member) 28 are inserted in this order. Each cylindrical portion 15m, 15n and 15p and each respective slidable pin 28 constitutes a projecting portion of the movable frame 15.

Figure 19:
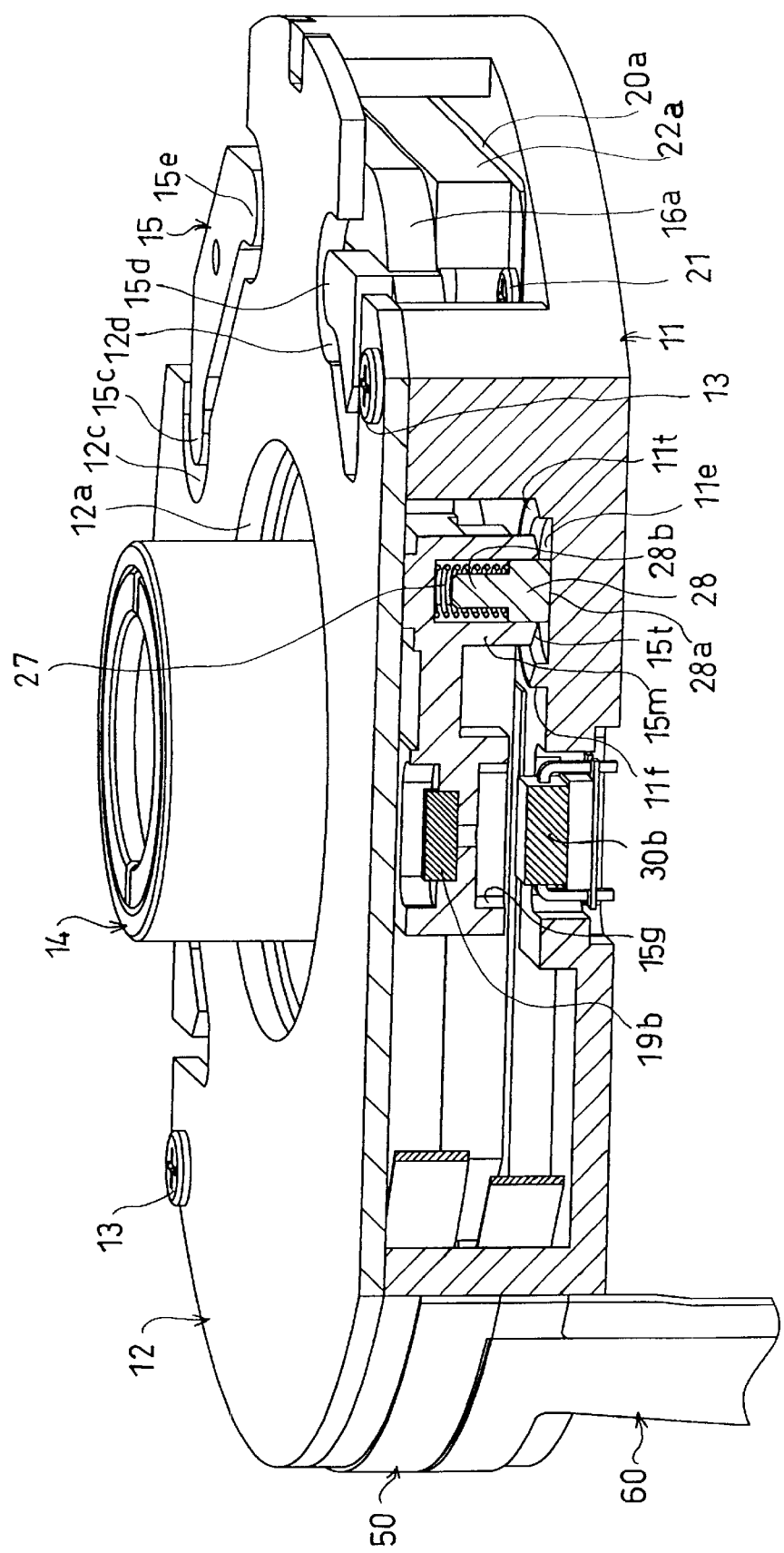
FIG. 19 is a perspective view, partly in cross section, of the image stabilizer unit shown in FIG. 2.

Each slidable pin 28 is always biased rearwardly in the direction of the optical axis O by the corresponding compression spring 27 to be always pressed against a corresponding plane circular surface 11e formed on the base 11 (see FIG. 19). Each slidable pin 28 is provided at one end in an axial direction thereof with a circular sliding end surface 28a which comes into pressing contact with the corresponding circular surface 11e. Each slidable pin 28 is further provided at the other end in an axial direction thereof with a projection 28b on which the corresponding compression spring 27 is fitted. Each compression spring 27, which brings the corresponding slidable pin 28 into pressing contact with the corresponding circular surface 11e, has a spring force which is predetermined so as to have a minimum influence on the movement of the movable frame 15 in a plane perpendicular to the optical axis O. The position of the movable frame 15 with respect to the base 11 in the direction of the optical axis O is fixed by the pressing contact of each slidable pin 28 against the corresponding circular surface 11e.

Each of the three hollow cylindrical portions 15m, 15n and 15p is provided, at an end surface thereof facing the base 11, with a conically-tapered annular convex surface 15t which has an axis extending parallel to the optical axis O and which is tapered in the direction towards the corresponding plane circular surface 11e (see FIG. 19). Normally, each conically-tapered annular convex surface 15t is withdrawn from the corresponding plane circular surface 11e by a predetermined distance and thus does not contact therewith (see FIGS. 19 and 23). However, once the movable frame 15 reaches a movable limit position thereof in a plane perpendicular to the optical axis, each of the three conically-tapered annular convex surfaces 15t comes into contact with a corresponding conically-tapered annular concave surface 11t formed on the base 11 (see FIG. 24). Each of the three conically-tapered annular convex surfaces 15t and the corresponding conically-tapered annular concave surface 11t together constitute a tilt prevention mechanism which prevents the second lens group L2 from tilting at the time the movable frame 15 reaches a movable limit position thereof relative to the base 11. The image stabilizer unit 10 is provided with three tilt prevention mechanisms (a tilt prevention device) in total which are arranged on a circle centered on the optical axis O, at an equi-angular distance. This mechanism will be later discussed in detail.

The movable frame 15 is provided on a surface thereof facing the yoke plate 12 with three protuberances 15s which are formed to correspond to the three cylindrical portions 15m, 15n and 15p in the direction of the optical axis O, respectively. Each protuberance 15s bulges towards the yoke plate 12. The end faces of the three protuberances 15s which face the yoke plate 12 lie in a common plane extending perpendicular to the optical axis O. The movable frame 15 moves in a plane perpendicular to the optical axis O while only the end faces of the three protuberances 15s of the front face of the movable frame 15 are in sliding contact with the yoke plate 12. This structure is effective to reduce the frictional force generated between the movable frame 15 and the yoke plate 12 when the movable frame 15 is driven.

The image stabilizer unit 10 is provided therein with an L-shaped yoke plate 20. This L-shaped yoke plate 20 is fixed by three set screws 21 to a corresponding L-shaped plane surface 11b (see FIG. 1) formed on the inner surface of the base 11 which faces the movable frame 15. The shape of the L-shaped surface 11b corresponds to the shape of the L-shaped yoke plate 20. The L-shaped yoke plate 20 is provided with four holes 20c, while the base 11 is provided on the L-shaped surface 11b with corresponding four projections 11c which are respectively fitted in the four holes 20c to thereby determine the fixed position of the L-shaped yoke plate 20 onto the L-shaped surface 11b. The L-shaped yoke plate 20 is provided with a first yoke portion 20a extending in the Y-direction and a second yoke portion 20b extending in the X-direction.

A first pair of permanent magnet bars 22a are fixed on the front face of the first yoke portion 20a so that the two projections 11c which respectively extend through the two holes 20c formed on the first yoke portion 20a are held between the first pair of permanent magnet bars 22a. Likewise, a second pair of permanent magnet bars 22b is fixed to the front face of the second yoke portion 20b so that the two projections 11c which respectively extend through the two holes 20c formed on the second yoke portion 20b are held between the second pair of permanent magnet bars 22b. The first pair of permanent magnet bars 22a and the second pair of permanent magnet bars 22b face the first coil 16a and the second coil 16b in the direction of the optical axis O, respectively. The first pair of permanent magnet bars 22a and the first coil 16a together constitute a first electromagnetic drive (first drive device), while the second pair of permanent magnet bars 22b and the second coil 16b together constitute a second electromagnetic drive (second drive device).

The base 11 is provided, on the opposite side of the central opening 11a from the first yoke portion 20a of the L-shaped yoke plate 20, with a pair of guide slots 11d which are aligned in the Y-direction. The L-shaped guide bar 24 is provided thereon with a second pair of guide rings 26 which are slidably fitted into the pair of guide slots 11d, respectively.

The base 11 is provided, at a position thereon facing the first LED 19a in the direction of the optical axis O, with a first PSD (one-dimensional semiconductor position sensitive device) 30a used to detect the position of the movable frame 15 in the X-direction. The first PSD 30a is secured to the base 11. Infrared rays emitted from the first LED 19a passes through a first slit 15h (see FIG. 5) to enter the first PSD 30a. The first slit 15h is formed on the movable frame 15 to extend in the Y-direction. The first LED 19a and the first PSD 30a are fundamental elements of a first position detector for detecting the variation in position of the movable frame 15 relative to the base 11 in the X-direction (first direction).

The base 11 is provided, at a position thereon facing the second LED 19b in the direction of the optical axis O, with a second PSD (one-dimensional semiconductor position sensitive device) 30b used to detect the position of the movable frame 15 in the Y-direction. The second PSD 30b is secured to the base 11. Infrared rays emitted from the second LED 19b passes through a second slit 15g (see FIG. 5) to enter the second PSD 30b. The second slit 15g is formed on the movable frame 15 to extend in the X-direction. The second LED 19b and the second PSD 30b are fundamental elements of a second position detector for detecting the variation in position of the movable frame 15 relative to the base 11 in the Y-direction (second direction).

The base 11 is provided on the front surface thereof with three ring-shaped protuberances 11f each of which defines the corresponding circular surface 11e thereinside. Each of the three slidable pins 28 is always pressed against the corresponding circular surface 11e by the corresponding compression spring 27. Each circular surface 11e has a predetermined area which substantially corresponds to the maximum range of movement of the corresponding slidable pin 28, which moves together with the movement of the movable frame 15. The movable frame 15 moves in a plane perpendicular to the optical axis O relative to the base 11 while only the tips of the three slidable pins 28 connected to the movable frame 15 are in sliding contact with the three circular surfaces 11e, respectively. This structure is effective to reduce the frictional force generated between the movable frame 15 and the base 11 when the movable frame 15 is driven.

The image stabilizer unit 10 is provided, between the base 11 and the movable frame 15 on the opposite side of the circular opening 11a with respect to the L-shaped yoke plate 20, with the aforementioned L-shaped guide bar 24. This L-shaped guide bar 24 is provided with a first guide arm 24a extending in the Y-direction and a second guide arm 24b extending in the X-direction. The aforementioned second pair of guide rings 26 are fixed by two set screws 26a on a surface of the first guide arm 24a which faces the base 11, while the aforementioned first pair of guide rings 25 are fixed by two set screws 25a on a surface of the second guide arm 24b which faces the movable frame 15.

As described above, the first pair of guide rings 25 are slidably fitted into the pair of guide slots 15f, respectively, while the second pair of guide rings 26 are slidably fitted into the pair of guide slots 11d, respectively. Therefore, the movable frame 15 is guided in the X-direction by the L-shaped guide bar 24, the first pair of guide rings 25 and the pair of guide slots 15f and at the same time in the Y-direction by the L-shaped guide bar 24, the second pair of guide rings 26 and the pair of guide slots 11d, so as to be movable with respect to the base 11.

The yoke plate 12 is provided at an approximate center thereof with a circular opening 12a through which the front surface of the second lens group L2 is exposed to the outside of the image stabilizer unit 10. The yoke plate 12 is provided with four cut-away portions 12b, 12c, 12d and 12e which are formed to correspond to the four projections 15b, 15c, 15d and 15e formed on the movable barrel 15, respectively. Each of the four cut-away portions 12b, 12c, 12d and 12e is formed to have a size corresponding to the maximum range of movement of the corresponding projection 15b, 15c, 15d or 15e so that the inner edge of each of the cut-away portions 12b, 12c, 12d and 12e functions as a limit stop against which the corresponding projection 15b, 15c, 15d or 15e abuts at the time the movable frame 15 moves to a movable limit position thereof relative to the base 11. Accordingly, the maximum range of movement of the movable frame 15 in each of the X-direction and the Y-direction (i.e., the movable limit of the movable frame 15 in radial directions perpendicular to the optical axis O) is defined by the combination of the four projections 15b, 15c, 15d and 15e and the four cut-away portions 12b, 12c, 12d and 12, respectively.

The first flexible PWB 50 having eight conductors (lines) in total is connected to the image stabilizer unit 10. One end and the other end of the first flexible PWB 50 are connected to the image stabilizer unit 10 and the control circuit 8, respectively.

Figure 14:
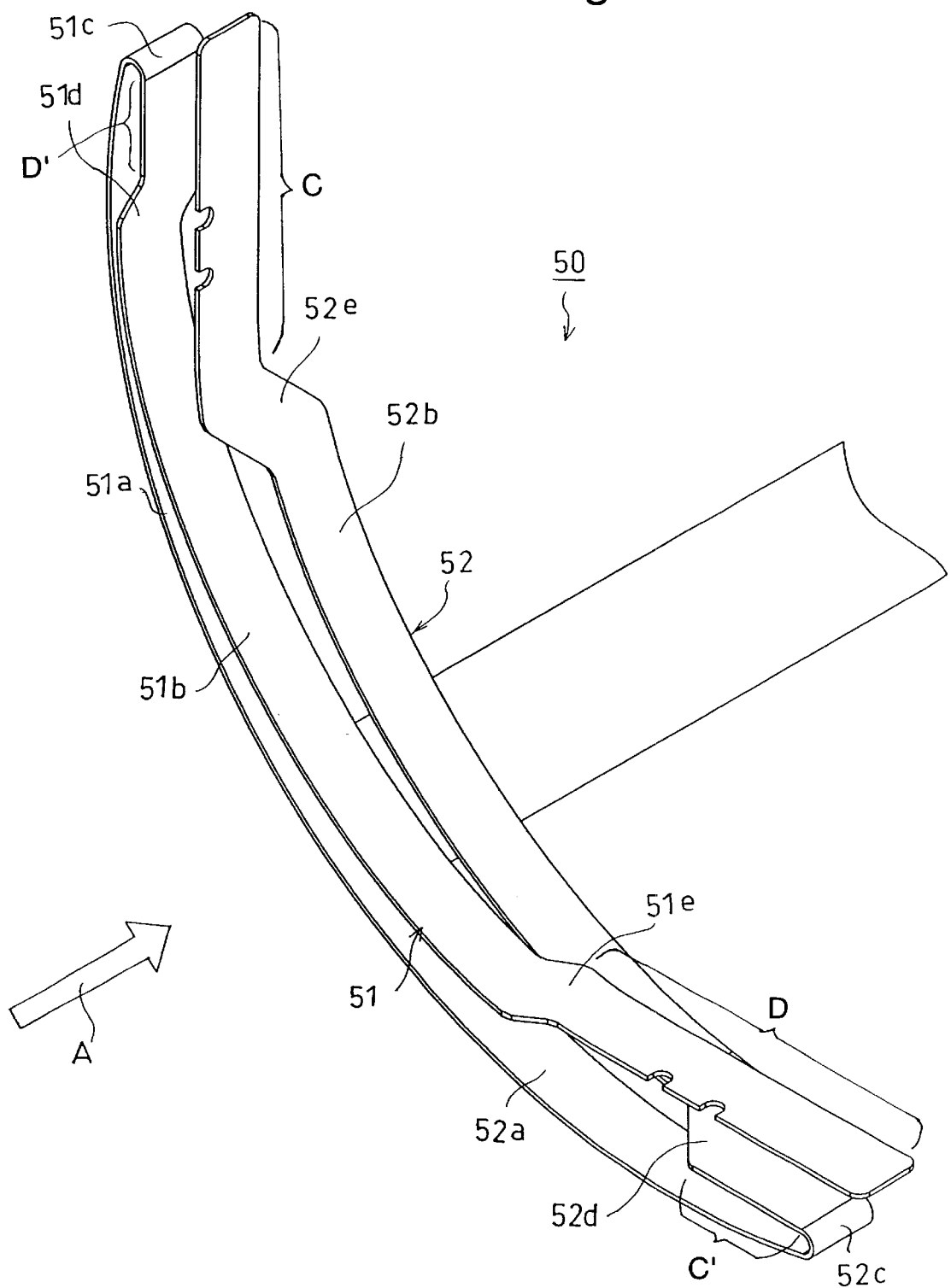
FIG. 14 is an enlarged perspective view of part of a flexible printed wiring board connected to the image stabilizer unit shown in FIG. 2.

One end (front end) of the first flexible PWB 50 which is connected to the image stabilizer unit 10 is bifurcated to provide two wiring strips, i.e., a first wiring strip 52 and a second wiring strip 51 (see FIG. 14). The first wiring strip 52 is provided therein with four conductors (not shown); two of the four conductors are used for the second coil 16b and the remaining two conductors are used for the first LED 19a. Likewise, the second wiring strip 51 is provided therein with four conductors (not shown); two of the four conductors are used for the first coil 16a and the remaining two conductors are used for the second LED 19b. As can be seen in FIG. 14, the first and second wiring strips 52 and 51 firstly extend in opposite directions substantially perpendicular to the longitudinal direction of the first flexible PWB 50 to be separate from each other along the circumferential direction of the base 11 about the optical axis O, and subsequently are folded back inwardly towards each folded portion of each respective second and first wiring strips (i.e., towards the optical axis O).

As shown in FIGS. 6 through 11, an arc-shaped peripheral wall 11g is formed integral with the base 11 along a circumferential portion thereof. The first wiring strip 52 includes an outer strip portion 52a and an inner strip portion 52b. The outer strip portion 52a is positioned along the outer peripheral surface of the peripheral wall 11g. Part of the first wiring strip 52 is folded back inwardly along one circumferential end 11i of the peripheral wall 11g so that the inner strip portion 52b is positioned inside the image stabilizer unit 10. Likewise, the second wiring strip 51 includes an outer strip portion 51a and an inner strip portion 51b. The outer strip portion 51a is positioned along the outer peripheral surface of the peripheral wall 11g. Part of the second wiring strip 51 is folded back inwardly along the other circumferential end 11h of the peripheral wall 11g so that the inner strip portion 51b is positioned inside the image stabilizer unit 10. The inner strip portions 51b and 52b, which are positioned inside the image stabilizer unit 10, are curved so as to bend towards the peripheral wall 11g and are positioned in a wiring strip accommodating space "S" formed between the peripheral wall 11g and the movable frame 15.

The first LED 19a is mounted on the inner strip portion 52b of the first wiring strip 52 so that the two legs of the first LED 19a are respectively soldered to two conductors of the first wiring strip 52, while the ends of two lead wires (i.e., the opposite ends of turns of wire of the second coil 16b) 53 which extend from the second coil 16b are soldered to the remaining two conductors of the first wiring strip 52. Similarly, the second LED 19b is mounted on the inner strip portion 51b of the second wiring strip 51 so that the two legs of the second LED 19b are respectively soldered to two conductors of the second wiring strip 51, while the ends of two lead wires (i.e., the opposite ends of turns of wire of the first coil 16a) 54 which extend from the first coil 16a are soldered to the remaining two conductors of the second wiring strip 51.

As shown in FIG. 14, the inner strip portion 52b of the first wiring strip 52 is provided, in the vicinity of a folded portion 52c (see FIG. 9) formed between the outer and inner strip portions 52a and 52b, with a first S-curved (S-shaped) portion 52d which is curved to bulge rearwardly in the direction of the optical axis O so as to lie along side (sidestep) the inner strip portion 51b of the second wiring strip 51 in the direction of the optical axis O. The inner strip portion 52b of the first wiring strip 52 is further provided, in the vicinity of the part thereof to which the first LED 19a is fixed, with a second S-curved (S-shaped) portion 52e which is curved to bulge forwardly in the direction of the optical axis O.

Likewise, the inner strip portion 51b of the second wiring strip 51 is provided, in the vicinity of a folded portion 51c formed between the outer and inner strip portions 51a and 51b, with a first S-curved portion 51d which is curved to bulge forwardly in the direction of the optical axis O so as to lie along side (sidestep) the inner strip portion 52b of the first wiring strip 52 in the direction of the optical axis O. The inner strip portion 51b of the second wiring strip 51 is further provided, in the vicinity of the portion thereof to which the second LED 19b is fixed, with a second S-curved portion 51e which is curved to bulge rearwardly in the direction of the optical axis O.

Figure 12:
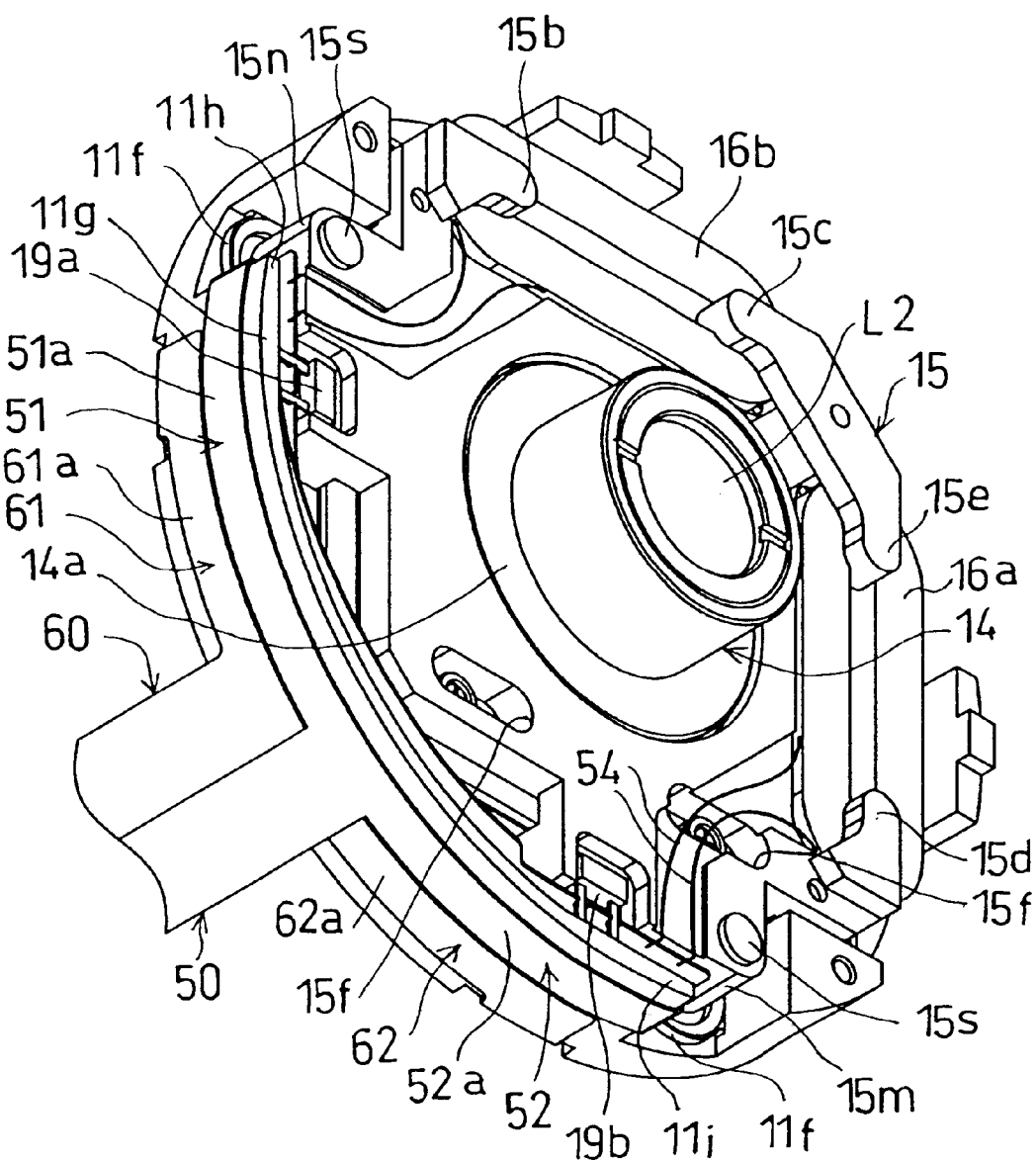
FIG. 12 is a perspective view of inner parts of the image stabilizer unit shown in FIG. 6.
Figure 13:
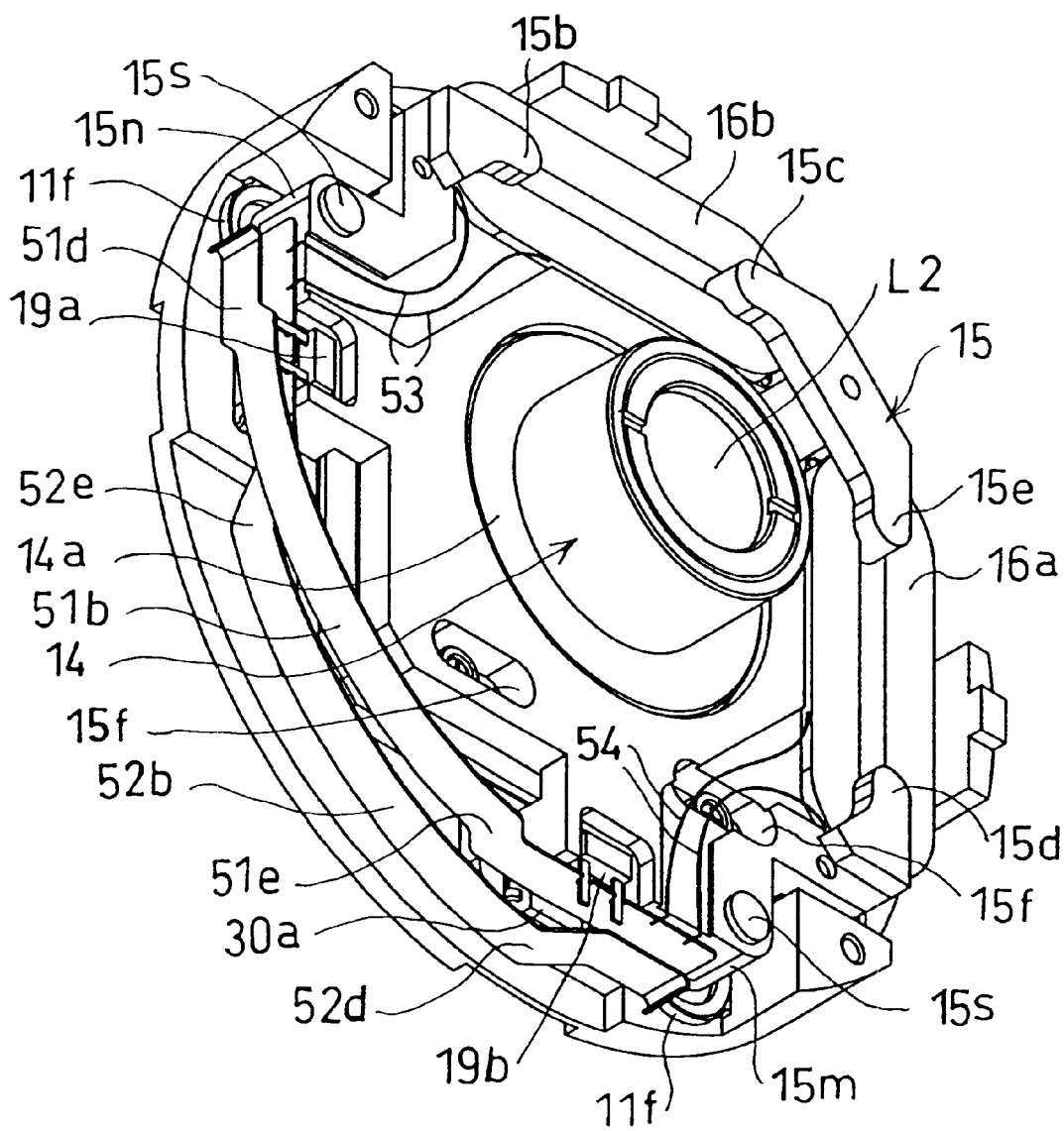
FIG. 13 is a perspective view, with some parts omitted therefrom, of the inner parts of the image stabilizer unit shown in FIG. 12.

The inner strip portion 52b of the first wiring strip 52 and the inner strip portion 51b of the first wiring strip 51 intersect each other in the wiring strip accommodating space "S" as viewed from the front of the image stabilizer unit 10 in the direction of the optical axis O, e.g., as viewed in the direction shown by an arrow "A" in FIG. 14. In each of FIGS. 6, 7 and 8, the intersecting portion is designated by an arrow "B". FIG. 12 is a perspective view of inner parts of the image stabilizer unit 10 with the yoke plate 12 removed, seen from an angle. FIG. 13 is a perspective view of inner parts of the image stabilizer unit 10, seen from the same angle as in FIG. 12, wherein the second flexible PWB 60, the arc-shaped peripheral wall 11g, and the portions of the first flexible PWB other than the inner strip portions 51b and 52b are removed for the purpose of illustration so that the intersecting portion between the inner strip portions 51b and 52b can be easily seen.

The second flexible PWB 60 having eight conductors (lines) in total is connected to the image stabilizer unit 10 to be positioned adjacent to the first flexible PWB 50 One end and the other end of the second flexible PWB 60 are connected to the image stabilizer unit 10 and the control circuit 8, respectively.

One end (front end) of the second flexible PWB 60 which is connected to the image stabilizer unit 10 is bifurcated to provide two wiring strips: a first wiring strip 61 and a second wiring strip 62 (see FIG. 1). The first wiring strip 61 is provided therein with four conductors (not shown) used for the first PSD 30a. Likewise, the second wiring strip 62 is provided therein with four conductors used for the second PSD 30b. As can be seen in FIG. 1, the first and second wiring strips 61 and 62 extend in opposite directions substantially perpendicular to the longitudinal direction of the second flexible PWB 60 to be separate from each other.

The first wiring strip 61 is provided with a circumferential strip portion 61a and a connecting end portion 61b. The circumferential strip portion 61a is positioned along the outer peripheral surface of the arc-shaped peripheral wall 11g. The connecting end portion 61b is bent inwardly from the plane of the circumferential strip portion 61a against a rear surface of the base 11 wherein the legs of the first PSD 30a are soldered onto the connecting end portion 61b. Similarly, the second wiring strip 62 is provided with a circumferential strip portion 62a and a connecting end portion 62b. The circumferential strip portion 62a is positioned along the outer peripheral surface of the arc-shaped peripheral wall 11g. The connecting end portion 62b is bent inwardly from the plane of the circumferential strip portion 62a against a rear surface of the base 11 wherein the legs of the second PSD 30b are soldered onto the connecting end portion 62b.

Figure 16:
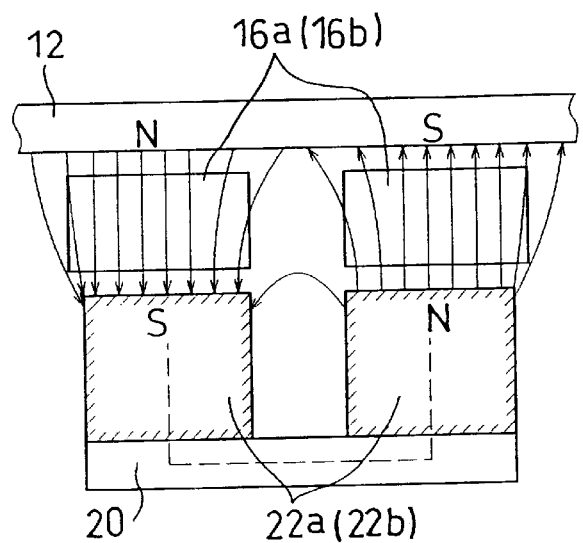
FIG. 16 is an explanatory view of an electromagnetic drive of the image stabilizer unit, showing the principle of driving of the image-stabilizing optical system.
Figure 17:
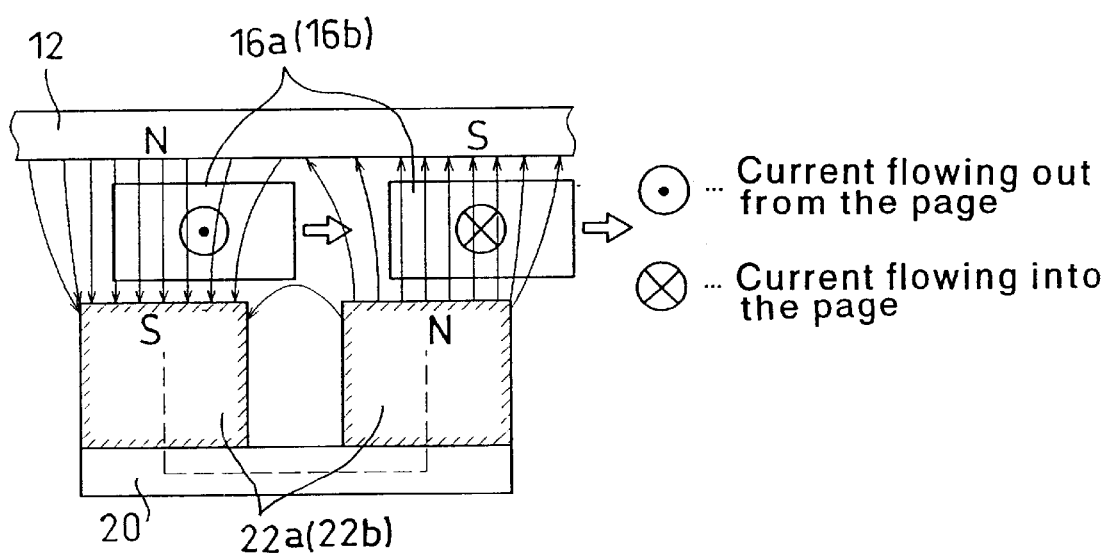
FIG. 17 is an explanatory view of the electromagnetic drive of the image stabilizer unit, showing the principle of driving of the image-stabilizing optical system.
Figure 18:
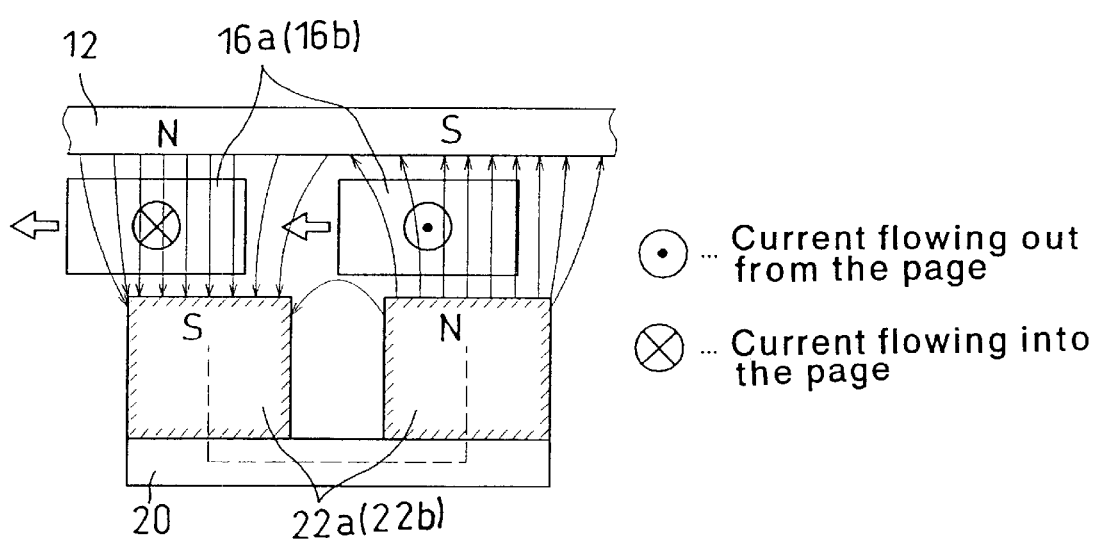
FIG. 18 is an explanatory view of the electromagnetic drive of the image stabilizer unit, showing the principle of driving of the image-stabilizing optical system.

FIGS. 16, 17 and 18 are explanatory views of each of the aforementioned first and second electromagnetic drives of the image stabilizer unit 10, showing the principle of driving of the image-stabilizing optical system, i.e., the second lens group L2. FIG. 16 shows a state where the first coil 16a (or the second coil 16b) is in a neutral position thereof, wherein no current is supplied to the first coil 16a (or the second coil 16b). FIG. 17 shows a state where current is supplied to the first coil 16a (or the second coil 16b) in one direction therethrough. FIG. 18 shows a state where current is supplied to the first coil 16a (or the second coil 16b) in the other direction therethrough. As can be seen from these drawings, each of the first coil 16a and the second coil 16b can be driven in each of two opposite directions in a plane perpendicular to the optical axis O by changing the direction of flow of current supplied to each of the first coil 16a and the second coil 16b. This makes it possible to drive the movable frame 15.

Figure 6:
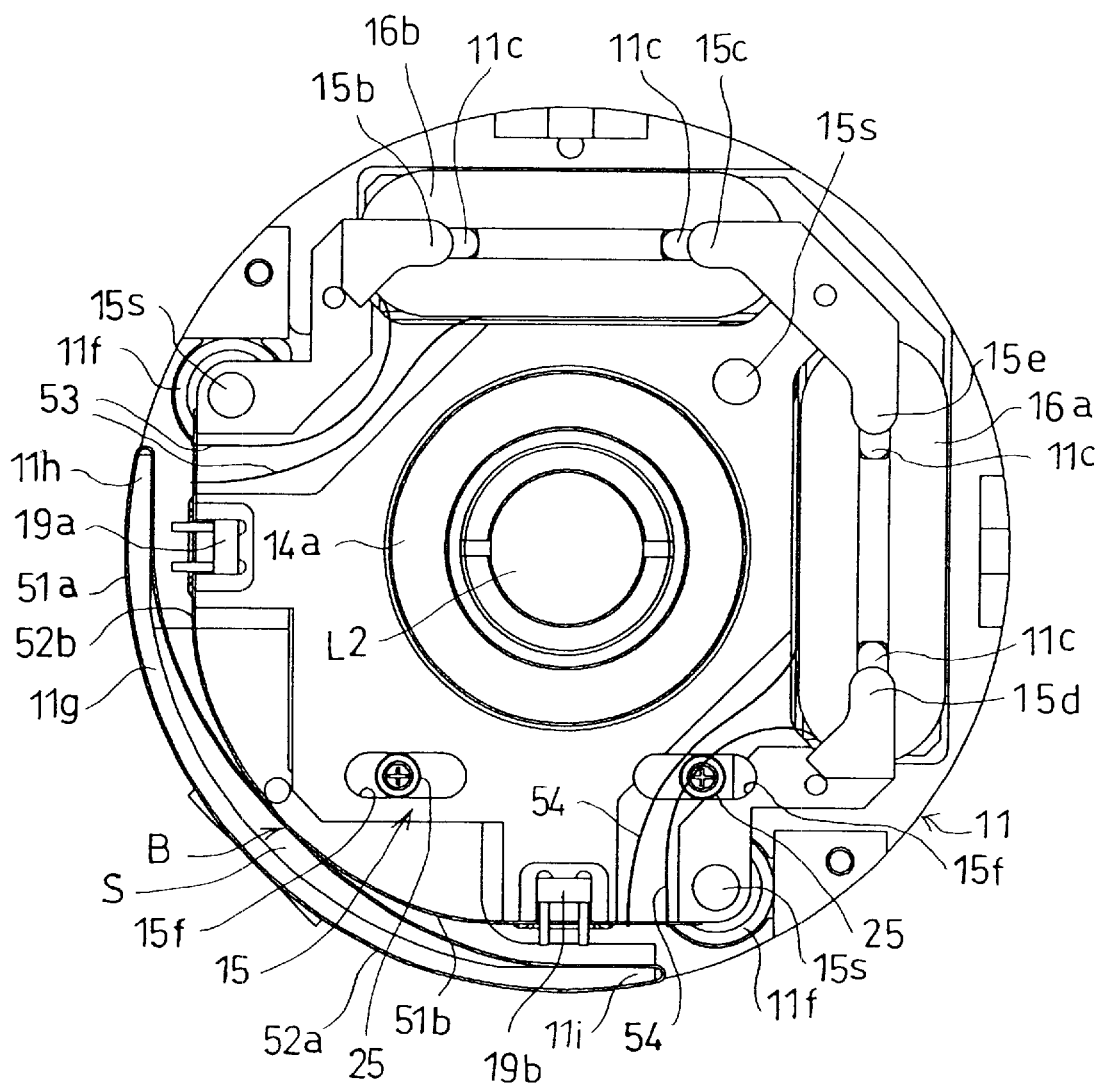
FIG. 6 is a front view of an inner portion of the image stabilizer unit shown in FIG. 2, in a state where a movable frame in the image stabilizer unit is in a neutral position thereof.
Figure 7:
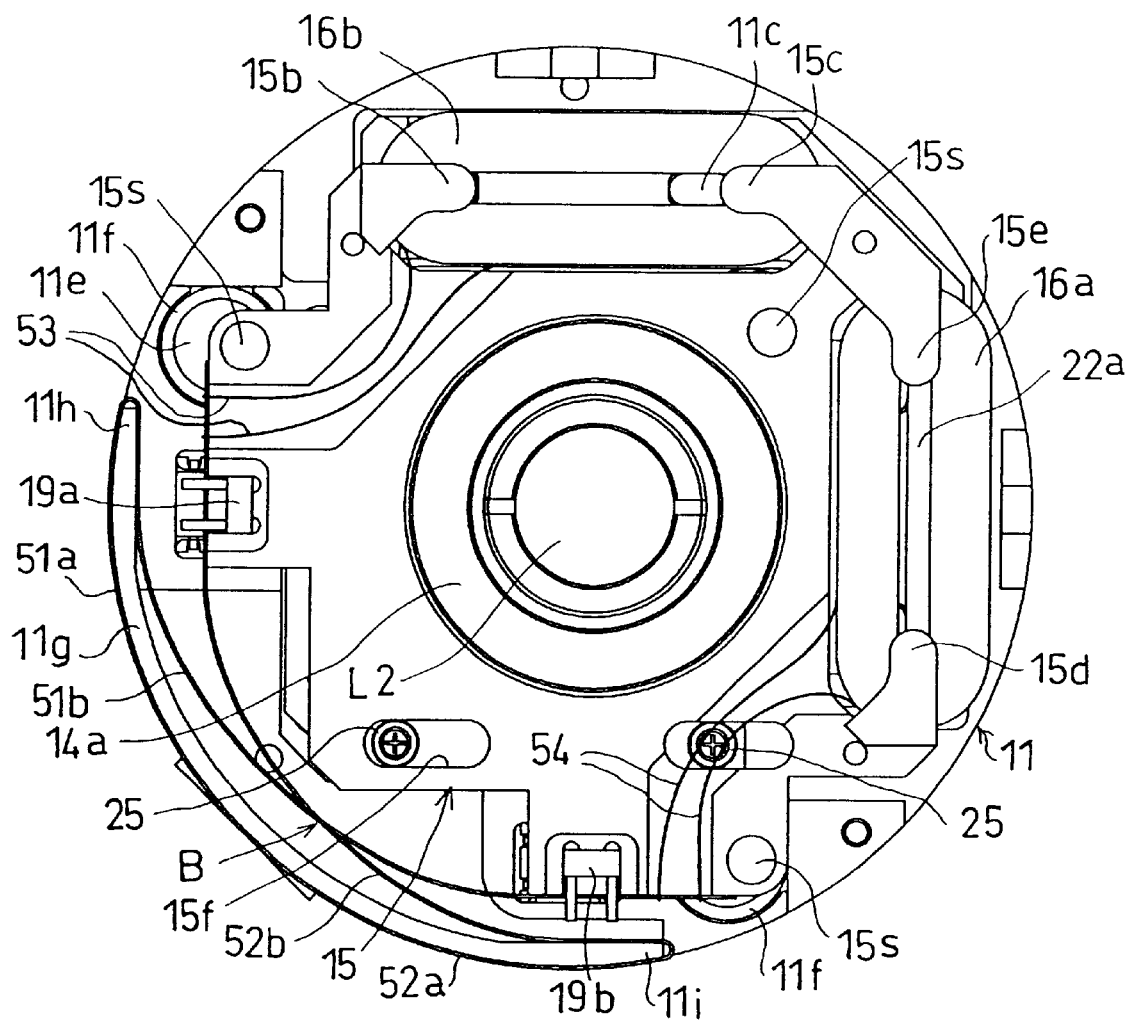
FIG. 7 is a front view of the inner portion of the image stabilizer unit shown in FIG. 2, in a state where the movable frame in the image stabilizer unit is in a movable limit position for compensation along the X-axis direction shown in FIG. 2.
Figure 8:
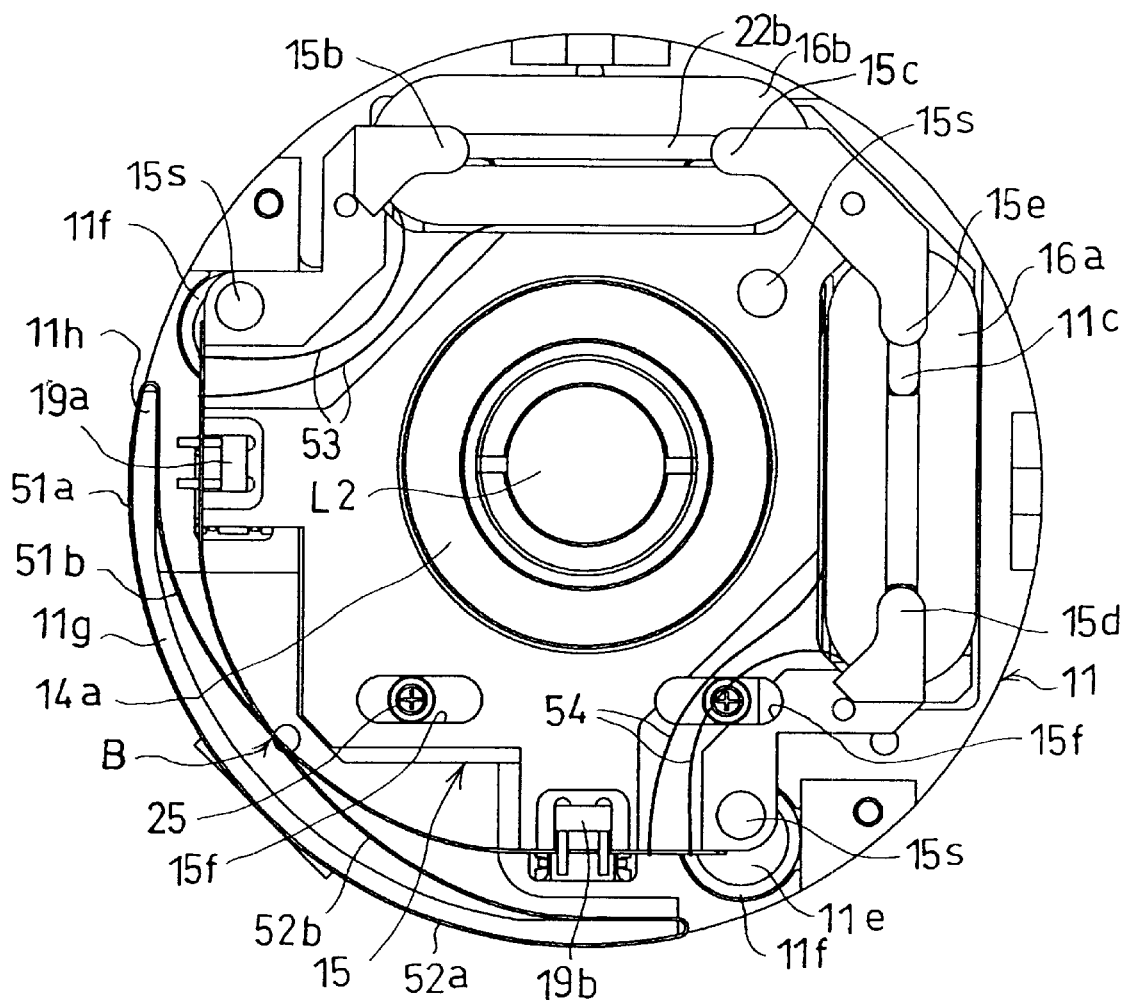
FIG. 8 is a front view of the inner portion of the image stabilizer unit shown in FIG. 2, in a state where the movable frame in the image stabilizer unit is in a movable limit position for compensation along the Y-axis direction shown in FIG. 2.
Figure 9:
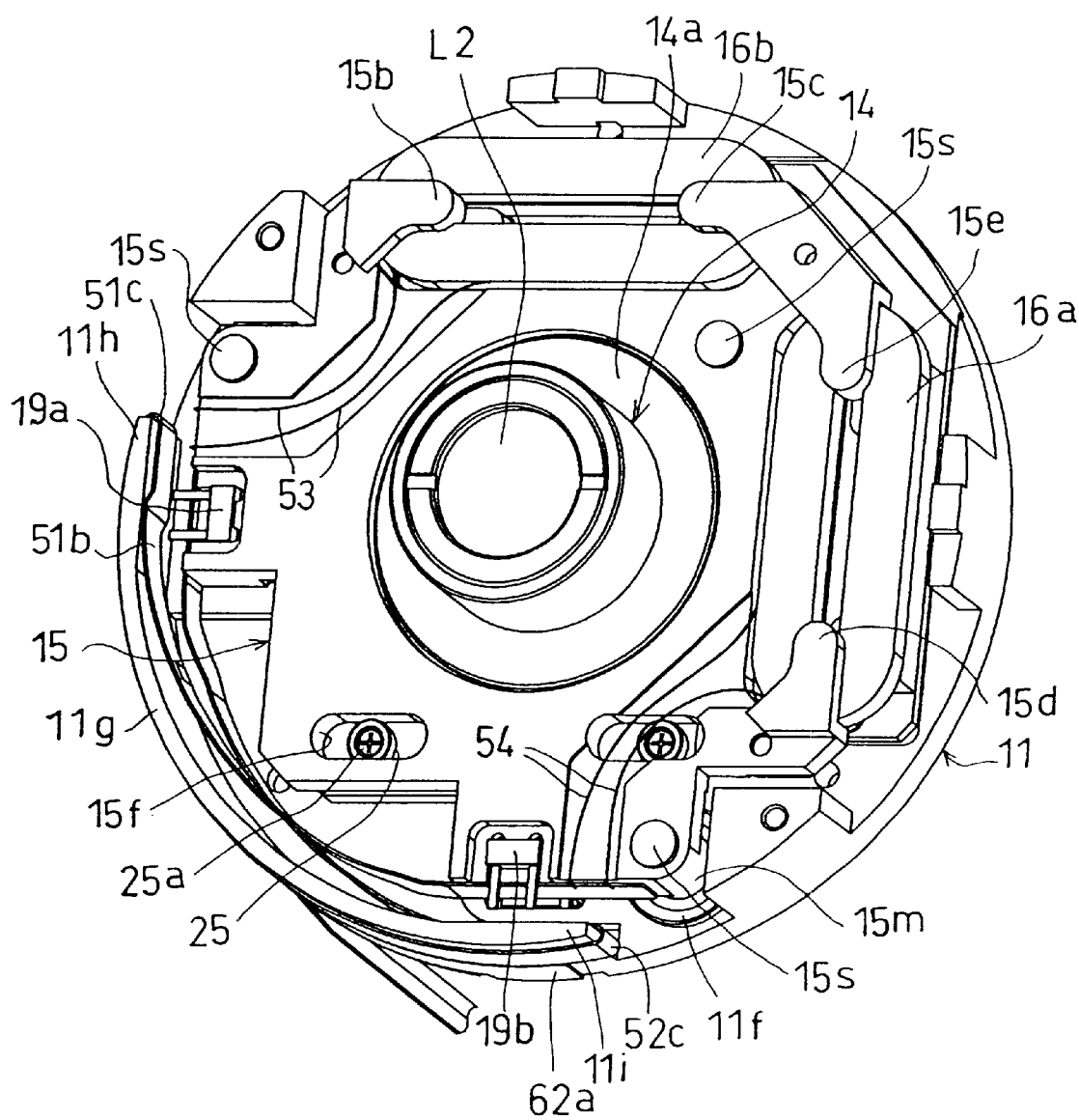
FIG. 9 is a perspective view of the inner portion of the image stabilizer unit shown in FIG. 6.
Figure 10:
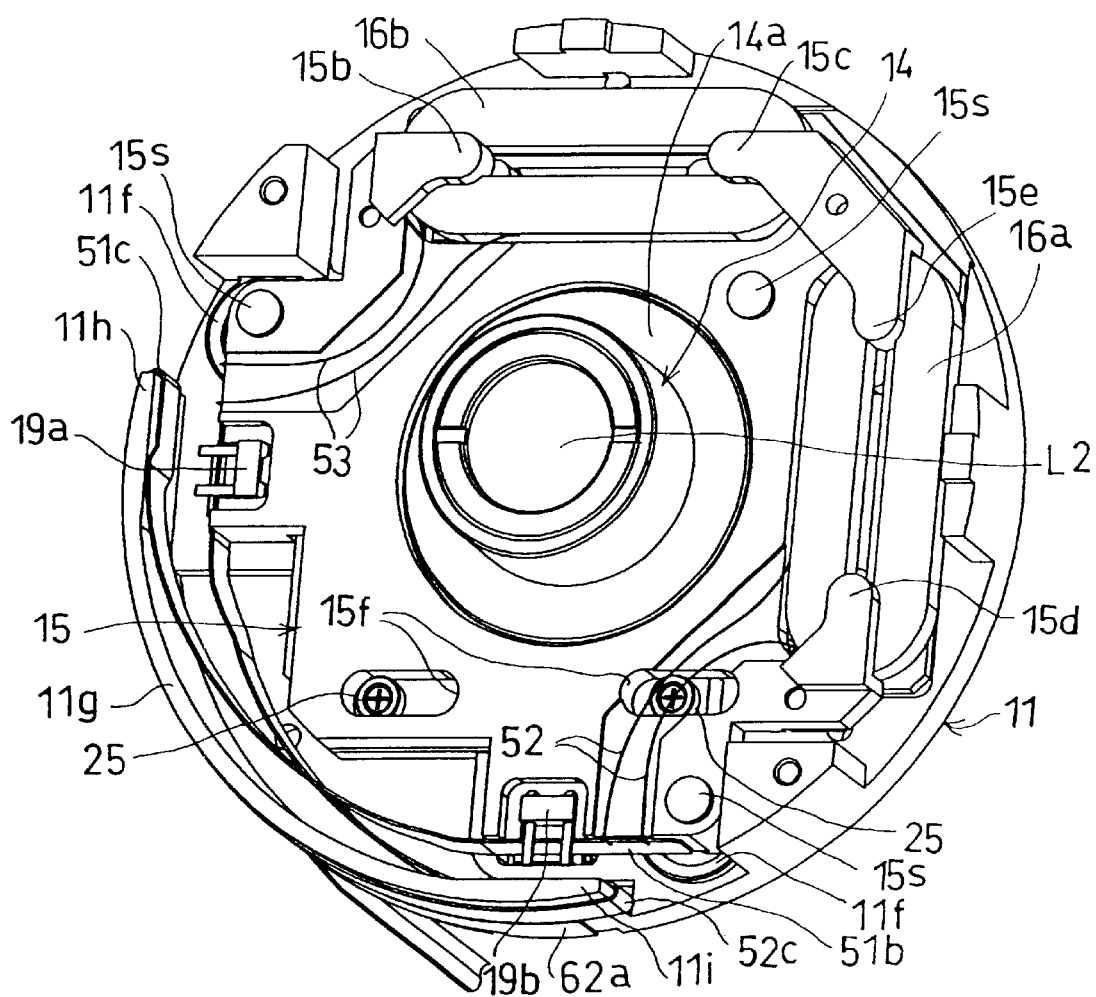
FIG. 10 is a perspective view of the inner portion of the image stabilizer unit shown in FIG. 7.
Figure 11:
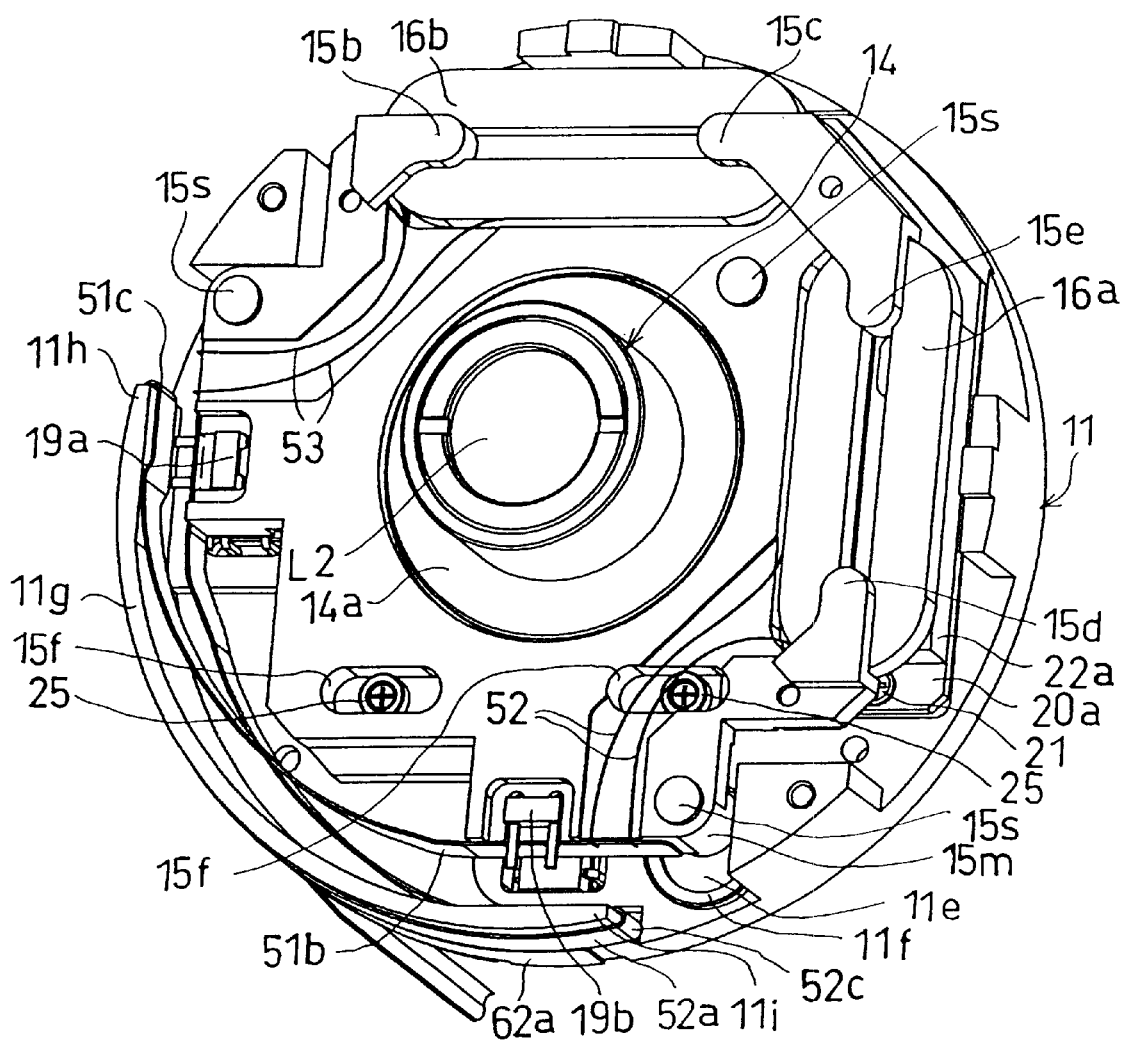
FIG. 11 is a perspective view of the inner portion of the image stabilizer unit shown in FIG. 8.

FIGS. 6 and 9 each show an inner portion of the image stabilizer unit 10 in the case where the movable frame 15 is in a neutral position thereof in a state where no current is supplied to either the first and second coils 16a and 16b. FIGS. 7 and 10 each show the inner portion of the image stabilizer unit 10 in a state where the movable frame 15 is in the movable limit position (compensation limit position) for compensation in one direction (the direction to the right as viewed in FIG. 7) along the X-axis direction. FIGS. 8 and 11 each show the inner portion of the image stabilizer unit 10 in a state where the movable frame 15 is in the movable limit position (compensation limit position) for compensation in one direction (the direction upwards as viewed in FIG. 8) along the Y-axis direction. In FIGS. 6 through 11, the yoke plate 12 is removed from the base 11 for the purpose of illustration.

Figure 23:
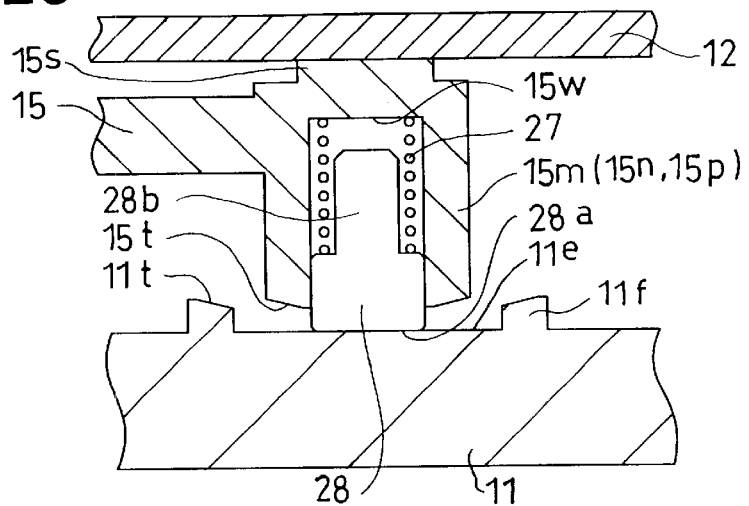
FIG. 23 is a cross sectional view of fundamental portion of the image stabilizer unit when the movable frame is in a neutral position thereof, showing a positional relation between one of the conically-tapered annular convex surfaces and the corresponding conically-tapered annular concave surface, according to the present invention.
Figure 24:
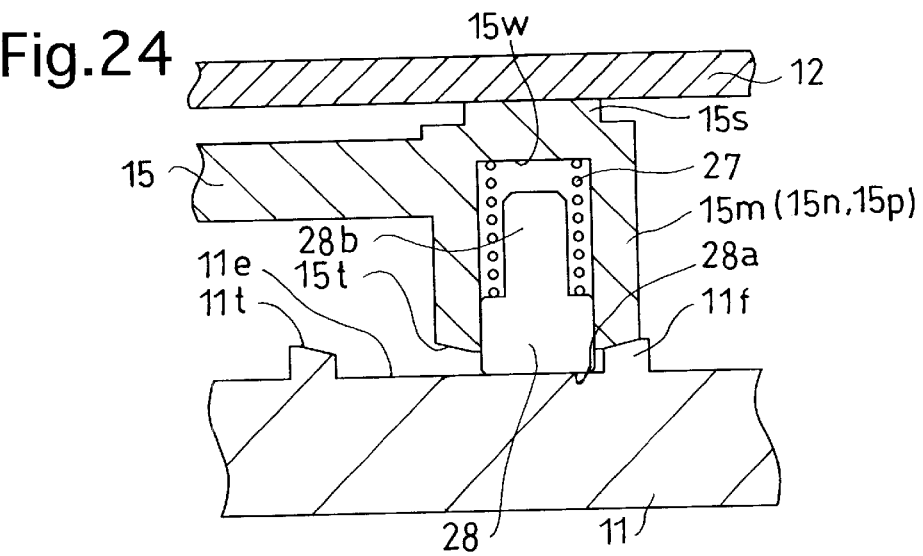
FIG. 24 is a cross sectional view of fundamental portion of the image stabilizer unit when the movable frame reaches a movable limit position thereof, showing a positional relation between one of the conically-tapered annular convex surfaces and the corresponding conically-tapered annular concave surface, according to the present invention.

The tilt prevention mechanism will be hereinafter discussed in detail. FIG. 19 is a perspective view of the image stabilizer unit 10, wherein one of the three tilt prevention mechanisms is shown in cross section. FIG. 23 shows one of the three tilt prevention mechanisms when the image stabilizer unit 10 is in a neutral position thereof, showing a positional relation between the conically-tapered annular convex surface 15t and the corresponding conically-tapered annular concave surface 11t. FIG. 24 shows one of the three tilt prevention mechanisms when the movable frame 15 reaches a movable limit position thereof, showing a positional relation between the conically-tapered annular convex surface 15t and the corresponding conically-tapered annular concave surface 11t.

As described above, the conically-tapered annular convex surface 15t is formed on each of the three hollow cylindrical portions 15m, 15n and 15p at an end surface thereof facing the base 11 so as to come into contact with the corresponding conically-tapered annular concave surface 11t at the time the movable frame 15 reaches a movable limit position thereof in a plane perpendicular to the optical axis.

Each pair of conically-tapered annular surfaces in the direction of the optical axis O, i.e., one of the three conically-tapered annular convex surfaces 15t and the corresponding conically-tapered annular concave surface 11t each have an axis extending parallel to the optical axis O. Each conically-tapered annular convex surface 15t does not contact with the conically-tapered annular concave surface 11t in a normal state, but has a diameter which makes each conically-tapered annular convex surface 15t possible to come into contact with the corresponding conically-tapered annular concave surface 11t once the movable frame 15 reaches a movable limit position thereof in a plane perpendicular to the optical axis O. Therefore, the outer diameter of each conically-tapered annular convex surface 15t is smaller than the inner diameter of the corresponding conically-tapered annular concave surface 11t.

Each conically-tapered annular convex surface 15t is tapered in the direction away from the axis thereof, which is coincident with the axis of the corresponding slidable pin 28, and forwardly in the direction of the optical axis O (upwardly as viewed in FIG. 23). On the other hand, each conically-tapered annular concave surface 11t is tapered in the direction away from the axis of the corresponding ring-shaped protuberance 11f and forwardly in the direction of the optical axis O by the same tilt angle as that of the conically-tapered annular convex surface 15t. The amount of projection of each protuberance 11f in the direction of the optical axis O from the corresponding circular surface 11e is predetermined so that the movable frame 15 (i.e., the second lens group L2) does not tilt in a state where the conically-tapered annular convex surface 15t is engaged with the corresponding conically-tapered annular concave surface 11t.

FIGS. 20, 21, 22 and 25 show an image stabilizer unit in which neither conically-tapered annular convex surfaces corresponding to the conically-tapered annular convex surfaces 15t nor conically-tapered annular concave surfaces corresponding to the conically-tapered annular concave surfaces 11t are formed, as a comparative example of the present embodiment of the image stabilizer unit 10. In the comparative example shown in FIGS. 20, 21, 22 and 25, a movable frame 15o, which corresponds to the movable frame 15 of the present embodiment, is not provided with any surface corresponding to the conically-tapered annular convex surface 15t. Further, a base 110, which corresponds to the base 11 of the present embodiment, is not provided with any surface corresponding to the conically-tapered annular concave surface 11t.

Figure 20:
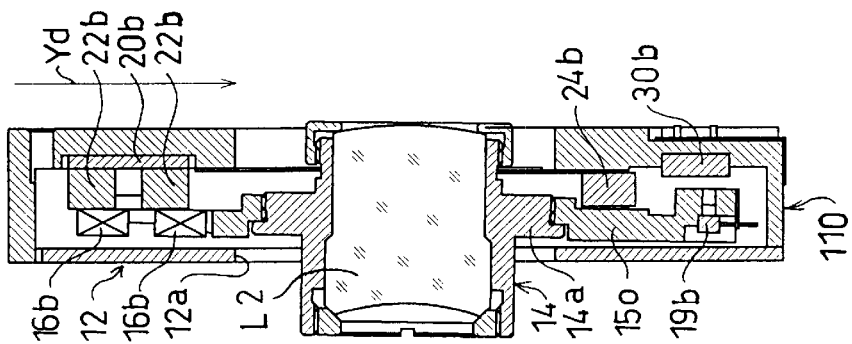
FIG. 20 is a cross sectional view of a comparative example of an image stabilizer unit in which neither the conically-tapered annular convex surfaces nor the conically-tapered annular concave surfaces of the present invention are formed, wherein the movable frame is in a neutral position thereof.
Figure 21:
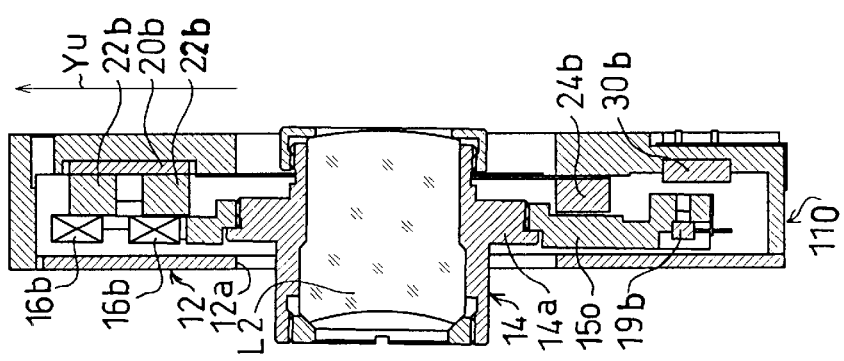
FIG. 21 is a cross sectional view of the image stabilizer unit shown in FIG. 20, wherein the movable frame reaches an upper movable limit position thereof in the Y-direction shown in FIG. 2.
Figure 25:
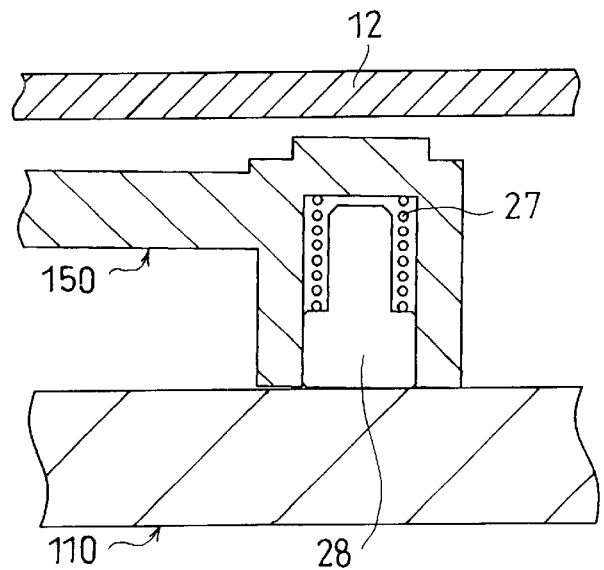
FIG. 25 is a cross sectional view of fundamental portion of the image stabilizer unit shown in FIGS. 20 through 22, showing a slidable pin and peripheral elements thereof.

FIG. 20 shows a state where the movable frame 15o is in a neutral position thereof relative to the base 110. FIG. 21 shows a state where the movable frame 15o reaches an upper movable limit position thereof in the Y-direction (in the direction shown by an arrow Yu in FIG. 20). FIG. 23 shows a state where the movable frame 15o reaches a lower movable limit position thereof in the Y-direction (in the direction shown by an arrow Yd in FIG. 21). FIG. 25 shows the slidable pin 28 and peripheral elements thereof in a state shown in FIG. 21 or 22.

Figure 22:
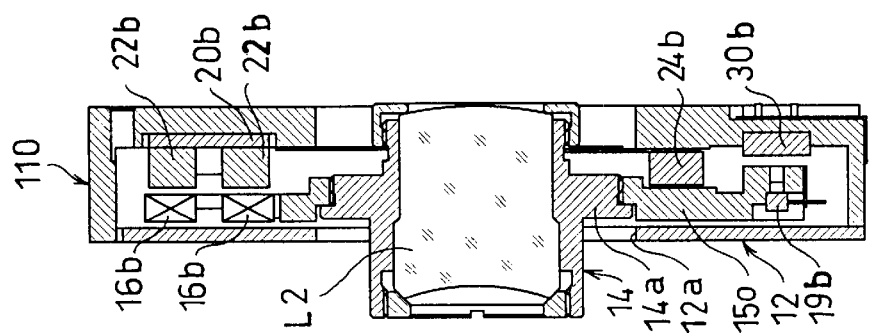
FIG. 22 is a cross sectional view of the image stabilizer unit shown in FIG. 20, wherein the movable frame reaches a lower movable limit position thereof in the Y-direction shown in FIG. 2.

As can be seen in FIGS. 20, 21, 22 and 25, in the case where neither the conically-tapered annular convex surfaces 15t nor the conically-tapered annular concave surfaces 11t are provided, the movable frame 15o slightly tilts at the time the movable frame 15 reaches a movable limit position thereof relative to the base 110. In FIGS. 21 and 22, an arrow "Q" shows the direction of the tilt of the movable frame 15 (namely, the second lens group L2).

In contrast, according to the present embodiment of the image stabilizer unit 10, since three tilt prevention mechanisms, each composed of one conically-tapered annular convex surfaces 15t and one conically-tapered annular concave surface 11t, which are arranged on a circle centered on the optical axis O, the movable frame 15 does not tilt even if the movable frame 15 reaches a movable limit position thereof relative to the base 11. Hence, the second lens group L2, which is supported by the movable frame 15, does not tilt either.

Since each of the conically-tapered annular convex surfaces 15t and each corresponding conically-tapered annular concave surface 11t is formed as a tapered surface, the clearance between each conically-tapered annular convex surface 15t and the corresponding conically-tapered annular concave surface 11t for allowing the movable frame 15 to be driven can be secured within the range of compensation (the maximum range of movement of the movable frame 15).

Further, at the time the movable frame 15 reaches a movable limit position thereof, one of the projections 15b, 15c, 15d or 15e bumps against the corresponding limit stop, i.e., the inner edge of the corresponding cut-away portions 12b, 12c, 12d or 12e, before any of the conically-tapered annular convex surfaces 15t and the corresponding conically-tapered annular concave surfaces 11t become jammed. According to this structure, each of the conically-tapered annular convex surfaces 15t and the corresponding conically-tapered annular concave surface 11t never become jammed.

Figure 26:
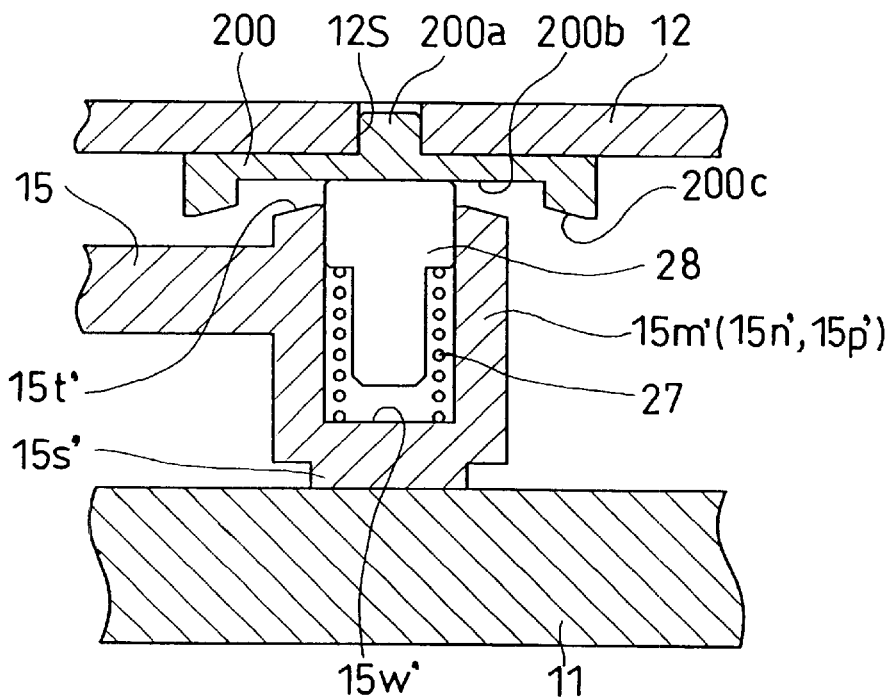
FIG. 26 is a cross sectional view of fundamental portion of another embodiment of the image stabilizer unit to which the present invention is applied.

FIG. 26 shows another embodiment (second embodiment) of the tilt prevention mechanism that can be provided in the image stabilizer unit 10. In the second embodiment, the three hollow cylindrical portions 15m, 15n and 15p of the previous embodiment (first embodiment) are replaced by three hollow cylindrical portions 15m', 15n' and 15p', respectively, each projecting forwardly in the direction of the optical axis O (upwardly as viewed in FIG. 26). Each of the hollow cylindrical portions 15m', 15n' and 15p' is closed at the rear end thereof and is open at the front end thereof in the direction of the optical axis O. Each of the hollow cylindrical portions 15m', 15n' and 15p' is provided therein with a guide hole 15w which is open at the front end thereof. In the guide hole 15w of each cylindrical portions 15m', 15n' and 15p', a compression spring (coil spring) 27 and a slidable pin (slidable member) 28 are inserted in this order. Each cylindrical portion 15m', 15n' and 15p' and each respective slidable pin 28 constitutes a projecting portion of the movable frame 15. The yoke plate 12 is provided, on the inner surface thereof facing the movable frame 15, with three support dishes 200 disposed to correspond to the three hollow cylindrical portions 15m', 15n' and 15p', respectively. Each support dish 200 is provided on the front surface at the center thereof with a projection 200a which is fitted in a corresponding fixing hole 12s formed on the yoke plate 12. Each support dish 200 is adhered to the front surface of the yoke plate 12 with the projection 200a thereof being fitted in the corresponding fixing hole 12s.

Each support dish 200 is further provided on the rear surface thereof with a plane circular surface 200b which functions similarly to the plane circular surface 11e formed on the base 11 of the first embodiment of the tilt prevention mechanism. Each support dish 200 is further provided, on the rear surface thereof around the circular surface 200b, with a conically-tapered annular concave surface 200c which functions similarly to the conically-tapered annular concave surface 11t formed on the base 11 of the first embodiment of the tilt prevention mechanism.

Each of the hollow cylindrical portions 15m', 15n' and 15p' is further provided, at the front end thereof around the open end of the guide hole 15w', with a conically-tapered annular convex surface 15t' which corresponds to the conically-tapered annular convex surface 15t of the first embodiment of the tilt prevention mechanism. Each slidable pin 28 is always biased forwardly in the direction of the optical axis O by the corresponding compression spring 27 to be always pressed against the plane circular surface 200b of the corresponding support dish 200 fixed to the yoke plate 12.

In the first embodiment of the tilt prevention mechanism, each slidable pin 28 is always biased towards the base 11 by the corresponding compression spring 27 to be always pressed against the corresponding plane circular surface 11e formed on the base 11 as shown in FIGS. 23 and 24. However, in the second embodiment of the tilt prevention mechanism, each slidable pin 28 is always biased towards the yoke plate 12 by the corresponding compression spring 27 to be always pressed against the corresponding plane circular surface 200b fixed to the yoke plate 12. According to the second embodiment of the tilt prevention mechanism, effects similar to those of the first embodiment can be expected.

Figure 27:
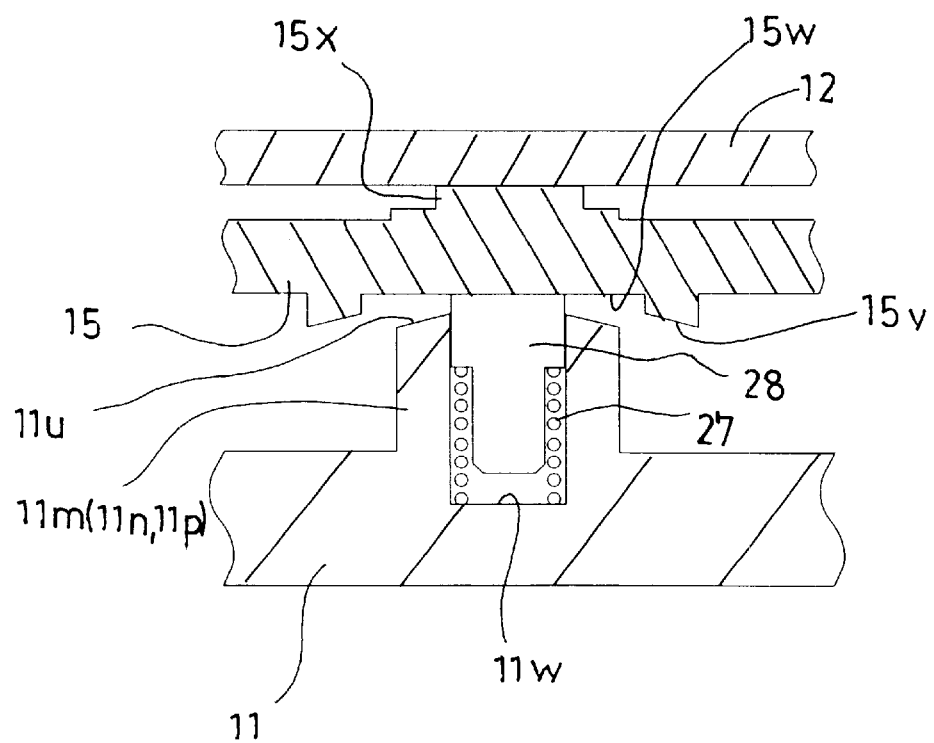
FIG. 27 is a cross sectional view of fundamental portion of still another embodiment of the image stabilizer unit to which the present invention is applied.

FIG. 27 shows yet another embodiment (third embodiment) of the tilt prevention mechanism that can be provided in the image stabilizer unit 10. In the third embodiment, three conically-tapered annular convex surfaces 11u which correspond to the three conically-tapered annular convex surfaces 15t of the first embodiment of the tilt prevention mechanism are formed on the base 11, while three conically-tapered annular concave surfaces 15v which correspond to the three conically-tapered annular concave surfaces 11t of the first embodiment of the tilt prevention mechanism are formed on the movable frame 15.

In the third embodiment, three hollow cylindrical portions 11m, 11n and 11p which respectively correspond to the three hollow cylindrical portions 15m', 15n' and 15p' of the second embodiment shown in FIG. 26 are formed on the base 11. Each of the hollow cylindrical portions 11m, 11n and 11p is closed at the rear end thereof and is open at the front end thereof in the direction of the optical axis O. Each of the hollow cylindrical portions 11m, 11n and 11p is provided therein with a guide hole 11w which is open at the front end thereof. In the guide hole 11w of each cylindrical portions 11m, 11n and 11p, a compression spring 27 and a slidable pin 28 are inserted in this order. Each cylindrical portion 11m, 11n and 11p and each respective slidable pin 28 constitutes a projecting portion of the base 11. The movable frame 15 is provided with three circular surfaces 15w which correspond to the three circular surfaces 11e of the first embodiment of the tilt prevention mechanism. Each slidable pin 28 is always pressed against the corresponding circular surface 15w by the corresponding compression spring 27. The movable frame 15 is further provided on the front surface thereof facing the yoke plate 12 with three protuberances 15x, which function in a similar manner to the three protuberances 15s of the first embodiment of the tilt prevention mechanism, at positions corresponding to the positions of the hollow cylindrical portions 11m, 11n and 11p in the direction of the optical axis O, respectively. According to the third embodiment of the tilt prevention mechanism, effects similar to those in the first embodiment can be expected.

In the illustrated embodiments, although three tilt prevention mechanisms are disposed around the optical axis O, the present invention is not limited solely to the particular embodiment. More than three tilt prevention mechanisms can be disposed around the optical axis O.

In the illustrated embodiments, although the second lens group L2 is driven to deviate from the optical axis O to stabilize the object image, the present invention is not limited solely to this particular embodiment. Any other lens group can be driven in the same manner for the same purpose.

In the illustrated embodiments, although the photographic optical system consists of three lens groups, the present invention is not limited solely to this particular embodiment. The present invention can be applied to a photographic optical system consisting of two or more than three lens groups.

In the illustrated embodiments, although the first and second pairs of permanent magnet bars 22a and 22b are fixed to the base 11 while the first and second coils 16a and 16b are fixed to the movable frame 15, this arrangement can be reversed. Namely, the first and second pairs of permanent magnet bars 22a and 22b can be fixed to the movable frame 15 while the first and second coils 16a and 16b can be fixed to the base 11.

In the illustrated embodiments, although the first and second PSDs 30a and 30b are fixed to the base 11 while the first and second LEDs 19a and 19b are fixed to the movable frame 15, this arrangement can be reversed. Namely, the first and second PSDs 30a and 30b can be fixed to the movable frame 15 while the first and second LEDs 19a and 19b can be fixed to the base 11. In this reverse arrangement, instead of the first and second LEDs 19a and 19b, the first and second PSDs 30a and 30b can be soldered onto the inner strip portions 52b and 51b of the first flexible PWB 50, respectively.

In the illustrated embodiments, although the variation in position of the movable frame 15 relative to the base 11 in the X-direction is detected by the first position detector composed of the first LED 19a and the first PSD 30a while the variation in position of the movable frame 15 relative to the base 11 in the Y-direction is detected by the second position detector composed of the second LED 19b and the second PSD 30b, the present invention is not limited solely to this particular embodiment. The variation in position of the movable frame 15 relative to the base 11 in the Y-direction can be detected by a combination of the first LED 19a and the first PSD 30a while the variation in position of the movable frame 15 relative to the base 11 in the X-direction can be detected by a combination of the second LED 19b and the second PSD 30b if the first slit 15h is formed on the movable frame 15 to extend in the X-direction; the second slit 15g is formed on the movable frame 15 to extend in the Y-direction; and each of the first and second PSDs 30a and 30b is arranged so that the longitudinal direction of the sensing portion of each PSD extends in a direction perpendicular to the longitudinal direction of the corresponding slit 15h or 15g.

In the illustrated embodiments, although the image stabilizing unit 10 is provided in the camera, the present invention is not limited solely thereto, but can be applied to any viewing optical instruments such as a telescope or a pair of binoculars.

As can be understood from the foregoing, according to the image stabilizer unit to which the present invention is applied, since three tilt prevention mechanisms, each composed of one conically-tapered annular convex surface and one conically-tapered annular concave surface, are arranged about the optical axis, the image-stabilizing optical system does not tilt even if the movable frame reaches a movable limit position thereof.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. An image stabilizer comprising:
 a movable member which supports an image-stabilizing optical system;
 a base which supports said movable member to be movable in a plane perpendicular to an optical axis of said image-stabilizing optical system; and
 at least three tilt prevention mechanisms, arranged on a circle centered on said optical axis, for preventing said image-stabilizing optical system from tilting at the time said image-stabilizing optical system reaches a movable limit position thereof in said plane perpendicular to said optical axis;
 wherein each of said at least three tilt prevention mechanisms comprises a conically-tapered annular convex surface and a conically-tapered annular concave surface having an axis extending parallel to said optical axis, said conically-tapered annular convex surface and said conically-tapered annular concave surface being correspondingly formed on one and the other of said movable member and said base, respectively, so that said conically-tapered annular convex surface contacts said conically-tapered annular concave surface when said movable member reaches said movable limit position.

2. The image stabilizer according to claim 1, wherein each of said at least three tilt prevention mechanisms is arranged at an equi-angular distance therebetween about said optical axis.

3. The image stabilizer according to claim 1, wherein an outer diameter of said conically-tapered annular convex surface is smaller than an inner diameter of said conically-tapered annular concave surface.

4. The image stabilizer according to claim 1, wherein said movable member comprises at least three projecting portions, arranged on a circle centered on said optical axis, each of said at least three projecting portions contacting with said base in a direction of said optical axis,
 wherein said conically-tapered annular convex surface is provided on each of said at least three projecting portions.

5. The image stabilizer according to claim 4, wherein said base comprises:
 at least three plane circular surfaces with which said at least three projecting portions come into contact, respectively; and
 at least three ring-shaped protuberances which protrude towards said movable member from circumferences of said at least three plane circular surfaces, respectively,
 wherein said conically-tapered annular concave surface is formed on an end surface of each of said at least three ring-shaped protuberances.

6. The image stabilizer according to claim 4, wherein each of said at least three projecting portions comprises a slidable member which is supported so as to be slidable in a direction parallel to said optical axis with respect to said movable member, and is continuously biased towards said base so as to contact said base,
 wherein, said conically-tapered annular convex surface is formed around said slidable member.

7. The image stabilizer according to claim 6, wherein each of said at least three projecting portions comprises a guide hole which extends in said direction of said optical axis, said slidable member being slidably fitted in said guide hole,
 wherein a compression spring is provided in said guide hole, for biasing said slidable member towards said base.

8. The image stabilizer according to claim 4, further comprising a support plate fixed to said base, said movable member being positioned between said support plate and said base.

9. The image stabilizer according to claim 8, wherein each of said at least three projecting portions comprises a slidable member which is supported so as to be slidable in a direction parallel to said optical axis with respect to said movable member, and is continuously biased towards said support plate so as to contact said support plate, wherein, said conically-tapered annular convex surface is formed around said slidable member.

10. The image stabilizer according to claim 1, wherein said base comprises at least three projecting portions, arranged on a circle centered on said optical axis, each of said at least three projecting portions contacting with said movable member in a direction of said optical axis, wherein said conically-tapered annular convex surface is provided on each of said at least three projecting portions.

11. The image stabilizer according to claim 10, wherein said movable member comprises:

at least three plane circular surfaces with which said at least three projecting portions come into contact, respectively; and at least three ring-shaped protuberances which protrude towards said base from circumferences of said at least three plane circular surfaces, respectively, wherein said conically-tapered annular concave surface is formed on an end surface of each of said at least three ring-shaped protuberances.

12. The image stabilizer according to claim 10, wherein each of said at least three projecting portions comprises a slidable member which is supported so as to be slidable in a direction parallel to said optical axis with respect to said base, and is continuously biased towards said movable member so as to contact said movable member, wherein, said conically-tapered annular convex surface is formed around said slidable member.

13. The image stabilizer according to claim 1, further comprising:

a first drive device which drives said movable member in a first direction perpendicular to said optical axis; and a second drive device which drives said movable member in a second direction perpendicular to said optical axis, said first direction and second direction being orthogonal to each other.

14. The image stabilizer according to claim 13, wherein said first drive device comprises a first magnet fixed to one of said base and said movable member, and a first coil fixed to the other of said base and said movable member to face said first magnet, and wherein said second drive device comprises a second magnet fixed to said one of said base and said movable member, and a second coil fixed to said other of said base and said movable member to face said second magnet.

15. The image stabilizer according to claim 14, further comprising:

first and second gyro sensors for sensing vibration in said first direction and said second direction, respectively; and a controller which supplies drive current to each of said first coil and said second coil, wherein the strength of said drive current is determined in accordance with output of each of said first and second gyro sensors.

16. The image stabilizer according to claim 1, wherein said image stabilizer is incorporated in a camera.

17. The image stabilizer according to claim 16, wherein said image stabilizer is formed as a unit.

18. An image stabilizer comprising:

a movable member which supports an image-stabilizing optical system;

a base which supports said movable member to be movable in a plane perpendicular to an optical axis of said image-stabilizing optical system; and a tilt prevention device for preventing said image-stabilizing optical system from tilting at the time said image-stabilizing optical system reaches a movable limit position thereof in said plane perpendicular to said optical axis;

wherein said tilt prevention device comprises at least three tilt prevention mechanisms arranged on a circle centered on said optical axis, each tilt prevention mechanism comprising two conically-tapered annular surfaces contactable with each other.

19. The image stabilizer according to claim 18, wherein each of said at least three tilt prevention mechanisms is arranged at an equi-angular distance therebetween about said optical axis.

20. The image stabilizer according to claim 18, wherein each of said three tilt prevention mechanisms is provided with a conically-tapered annular convex surface and a conically-tapered annular concave surface formed on one and the other of said movable member and said base, respectively, each of said conically-tapered annular convex surface and said corresponding conically-tapered annular concave surface having an axis extending parallel to said optical axis; and when said image-stabilizing optical system reaches said movable limit position thereof in said plane perpendicular to said optical axis, said conically-tapered annular convex surface and said conically-tapered annular concave surface, of each of said tilt prevention mechanism, contact each other so that tilting of said movable member with respect to said base is prevented.

* * * * *